(12) United States Patent
Iwane

(10) Patent No.: US 11,079,607 B2
(45) Date of Patent: Aug. 3, 2021

(54) IMAGE DISPLAY DEVICE

(71) Applicant: NIKON CORPORATION, Tokyo (JP)

(72) Inventor: Toru Iwane, Yokohama (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 16/390,878

(22) Filed: Apr. 22, 2019

(65) Prior Publication Data

US 2019/0250419 A1 Aug. 15, 2019

Related U.S. Application Data

(60) Division of application No. 13/474,169, filed on May 17, 2012, now Pat. No. 10,317,686, which is a
(Continued)

(30) Foreign Application Priority Data

Jun. 16, 2010 (JP) .................................. 2010-137391
Jun. 10, 2011 (JP) .................................. 2011-130067

(51) Int. Cl.
*G02B 30/27* (2020.01)
*G03B 35/24* (2021.01)
(Continued)

(52) U.S. Cl.
CPC ............ *G02B 30/27* (2020.01); *G03B 35/24* (2013.01); *H04N 13/232* (2018.05); *H04N 13/307* (2018.05)

(58) Field of Classification Search
CPC ............ G02B 27/2214; H04N 13/307; H04N 13/232; G03B 35/24
See application file for complete search history.

(56) References Cited

U.S. PATENT DOCUMENTS 5,790,086 A    8/1998   Zelitt
7,002,749 B2   2/2006   Kremen
(Continued)

FOREIGN PATENT DOCUMENTS

CN        1175309 A    3/1998
CN    101226325 A    7/2008
(Continued)

OTHER PUBLICATIONS

Jun. 1, 2015 Office Action issued in Chinese Patent Application No. 201180016408.2.
(Continued)

*Primary Examiner* — Michael Le
(74) *Attorney, Agent, or Firm* — Oliff PLC

(57) ABSTRACT

An image display device includes: an input unit that inputs image data constituted with pixel data, each set of the pixel data being generated based upon a plurality of image signals output from a plurality of image-capturing pixels arrayed in correspondence to a plurality of photographic micro-lenses distinct from one another; a generation unit that generates display image data containing three-dimensional information based upon the image data; a display unit constituted with a plurality of display pixels disposed in a two-dimensional pattern, which emits light fluxes from the plurality of display pixels in correspondence to the display image data; and a micro-lens array that includes a plurality of micro-lenses, via which a three-dimensional image is formed by combining the light fluxes emitted from the plurality of display pixels, disposed in a two-dimensional array pattern.

3 Claims, 16 Drawing Sheets

Related U.S. Application Data continuation of application No. PCT/JP2011/063840, filed on Jun. 16, 2011.

(60) Provisional application No. 61/503,970, filed on Jul. 1, 2011, provisional application No. 61/487,473, filed on May 18, 2011.

(51) Int. Cl.
*H04N 13/232* (2018.01)
*H04N 13/307* (2018.01)

(56) References Cited

U.S. PATENT DOCUMENTS

| | | | |
|---|---|---|---|
| 2002/0008674 A1* | 1/2002 | Son | H04N 13/363 345/4 |
| 2003/0016444 A1 | 1/2003 | Brown et al. | |
| 2005/0088749 A1 | 4/2005 | Kremen | |
| 2005/0180020 A1 | 8/2005 | Steenblik et al. | |
| 2005/0226319 A1 | 10/2005 | Harada et al. | |
| 2007/0252074 A1 | 11/2007 | Ng et al. | |
| 2008/0031497 A1 | 2/2008 | Kishigami et al. | |
| 2008/0165423 A1 | 7/2008 | Steenblik et al. | |
| 2009/0140131 A1* | 6/2009 | Utagawa | H04N 9/04557 250/226 |
| 2009/0295964 A1 | 12/2009 | Utagawa et al. | |
| 2010/0026852 A1 | 2/2010 | Ng et al. | |
| 2010/0045844 A1* | 2/2010 | Yamamoto | H04N 5/2254 348/340 |
| 2010/0165221 A1* | 7/2010 | Krijn | G02B 30/27 349/15 |
| 2010/0328433 A1 | 12/2010 | Li | |
| 2011/0063281 A1 | 3/2011 | Hsu et al. | |
| 2014/0085427 A1 | 3/2014 | Li | |

FOREIGN PATENT DOCUMENTS

| | | |
|---|---|---|
| CN | 101656835 A | 2/2010 |
| CN | 101995754 A | 3/2011 |
| EP | 2180362 A1 | 4/2010 |
| EP | 2 190 362 A1 | 6/2010 |
| JP | H08-289329 A | 11/1996 |
| JP | H10-150675 A | 6/1998 |
| JP | H10-227995 A | 8/1998 |
| JP | H10-319342 A | 12/1998 |
| JP | 2000-308091 A | 11/2000 |
| JP | 2003-075946 A | 3/2003 |
| JP | 2003-279894 A | 10/2003 |
| JP | 2004-333691 A | 11/2004 |
| JP | 2005-173190 A | 6/2005 |
| JP | 2005-175539 A | 6/2005 |
| JP | 2005-303966 A | 10/2005 |
| JP | 2007-004471 A | 1/2007 |
| JP | 2007-71922 A | 3/2007 |
| JP | 2007-514188 A | 5/2007 |
| JP | 2007-199226 A | 8/2007 |
| JP | 2008-515110 A | 5/2008 |
| JP | 2008-216340 A | 9/2008 |
| JP | 2010-50707 A | 3/2010 |
| WO | 2007/092545 A2 | 8/2007 |
| WO | 2009/044776 A1 | 4/2009 |

OTHER PUBLICATIONS

Feb. 2, 2016 Office Action issued in Japanese Patent Application No. 2011-130067.
Jan. 5, 2016 Office Action issued in Chinese Patent Application No. 201180016408.2.
Jun. 7, 2016 Office Action Issued in U.S Appl. No. 13/474,169.
Sep. 5, 2016 Office Action issued in Chinese Patent Application No. 201180016408.2.
Oct. 4, 2016 Office Action issued in Japanese Patent Application No. 2011-130067.
Jan. 23, 2017 Office Action issued in U.S. Appl. No. 13/474,169.
Nov. 1, 2016 Office Action issued in Japanese Patent Application No. 2015-153729.
Apr. 25, 2017 Office Action issued in Japanese Patent Application No. 2015-153729.
Sep. 14, 2017 Office Action issued in U.S. Appl. No. 13/474,169.
Sep. 19, 2017 Office Action issued in Japanese Patent Application No. 2015-153729.
May 14, 2018 Office Action issued in U.S. Appl. No. 13/474,169.
Oct. 30, 2018 Office Action issued in Japanese Patent Application No. 2017-242383.
Mar. 26, 2019 Office Action issued in Japanese Patent Application No. 2017-242383.
Feb. 8, 2019 Corrected Notice of Allowance and Fee(s) Due issued in U.S. Appl. No. 13/474,169.
Nov. 16, 2014 Office Action issued in U.S. Appl. No. 13/474,169.
Mar. 27, 2015 Office Action issued in U.S. Appl. No. 13/474,169.
Nov. 6, 2015 Office Action issued in U.S. Appl. No. 13/474,169.
Feb. 1, 2019 Notice of Allowance and Fee(s) Due issued in U.S. Appl. No. 13/474,169.
Jul. 12, 2011 International Search Report issued in International Patent Application No. PCT/JP2011/063840.
Apr. 30, 2019 Notice of Allowance issued in U.S. Appl. No. 13/474,169.
Sep. 3, 2014 Office Action issued in Chinese Patent Application No. 201180016408.2.
Jul. 2, 2019 Office Action issued in Chinese Patent Application No. 201710826302.8.
Nov. 10, 2020 Office Action issued in Japanese Patent Application No. 2019-173726.

* cited by examiner

IMAGE DISPLAY DEVICE

INCORPORATION BY REFERENCE

This is a Division of U.S. application Ser. No. 13/474,169 filed Apr. 17, 2012 (now U.S. Pat. No. 10,317,686), which claims the benefit of U.S. Provisional Applications No. 61/487,473 filed May 18, 2011 and No. 61/503,970 filed Jul. 1, 2011. U.S. application Ser. No. 13/474,169 also is a continuation of International Application No. PCT/JP2011/063840 filed Jun. 16, 2011. This application also claims priority from Japanese Applications No. 2010-137391 filed on Jun. 16, 2010 and No. 2011-130067 filed on Jun. 10, 2011. The disclosure of each of the earlier applications is incorporated herein by reference in its entirety.

BACKGROUND OF THE INVENTION

1. Field of the Invention

The present invention relates to an image display device.

2. Description of Related Art

Japanese Laid Open Patent Publication No. 2008-216340 discloses display devices that are capable of displaying a stereoscopic image through integral photography.

SUMMARY OF THE INVENTION

A display device in the related art, which invariably displays an image by projecting an image photographed as a three-dimensional image, requires a gradient index lens or the like in order to display the image as an upright image.

According to claim 1 of the present invention, an image display device comprises: an input unit that inputs image data constituted with pixel data, each set of the pixel data being generated based upon a plurality of image signals output from a plurality of image-capturing pixels arrayed in correspondence to a plurality of photographic micro-lenses distinct from one another; a generation unit that generates display image data containing three-dimensional information based upon the image data; a display unit constituted with a plurality of display pixels disposed in a two-dimensional pattern, which emits light fluxes from the plurality of display pixels in correspondence to the display image data; and a micro-lens array that includes a plurality of micro-lenses, via which a three-dimensional image is formed by combining the light fluxes emitted from the plurality of display pixels, disposed in a two-dimensional array pattern.

According to the 2nd aspect of the present invention, it is preferred that in the image display device according to the 1st aspect, the plurality of micro-lenses are each disposed in correspondence to the plurality of display pixels; and the generation unit generates the display image data so as to constitute one picture element in the three-dimensional image by combining light fluxes emitted from the plurality of display pixels disposed in correspondence to a plurality of micro-lenses.

According to the 3rd aspect of the present invention, it is preferred that in the image display device according to the 2nd aspect, the generation unit generates the display image data by ensuring that a positional relationship, equivalent to a positional relationship among the plurality of image-capturing pixels corresponding to each set of pixel data, is achieved among the plurality of display pixels that emit the light fluxes.

According to the 4th aspect of the present invention, it is preferred that in the image display device according to the 3rd aspect, the generation unit generates the display image data so as to achieve point symmetry for the positional relationship with which the plurality of image-capturing pixels corresponding to each set of pixel data are arrayed, and the positional relationship with which the plurality of display pixels are arrayed.

According to the 5th aspect of the present invention, it is preferred that in the image display device according to the 1st aspect, the generation unit generates the display image data so that the three-dimensional image is reproduced near the micro-lenses and that a magnification factor of the three-dimensional image assumed along a depthwise direction is compressed relative to the magnification factor assumed along a direction in which a plane of the micro-lens array ranges.

According to the 6th aspect of the present invention, it is preferred that in the image display device according to the 5th aspect, the generation unit generates the display image data by ensuring that the magnification factor along the depthwise direction is a multiple of the square of the magnification factor assumed along the direction in which the plane of the micro-lens array ranges.

According to the 7th aspect of the present invention, it is preferred that in the image display device according to the 1st aspect, the generation unit generates the display image data by standardizing a positional relationship among the plurality of image-capturing pixels corresponding to each set of pixel data in reference to a pseudo-optical axis of a micro-lens.

According to the 8th aspect of the present invention, it is preferred that in the image display device according to the 7th aspect, an F number of the micro-lenses is greater than the F number of the photographic micro-lenses.

According to the 9th aspect of the present invention, the image display device according to the 1st aspect may further comprise: a viewing optical system enabling viewing of the three-dimensional image formed via the micro-lenses.

According to the 10th aspect of the present invention, it is preferred that in the image display device according to the 9th aspect, the viewing optical system is constituted with a virtual image lens that is disposed so that a plane of the three-dimensional image is formed between the virtual image lens and a focal length thereof.

According to the present invention, a subject image can be displayed as a three-dimensional stereoscopic image having spatial depth.

DESCRIPTION OF PREFERRED EMBODIMENT

The digital camera achieved in an embodiment adopts a structure that allows it to generate image data in correspondence to a desired focus position setting. When a subject assuming a three-dimensional shape is photographed with this digital camera, image data containing information pertaining to the three-dimensional shape (stereoscopic information) are generated. The digital camera in the embodiment allows an image corresponding to the image data containing such stereoscopic information to be displayed so that the user is able to observe it as a three-dimensional, stereoscopic image (image having spatial depth). The following is a detailed description of the digital camera.

Figure 1:
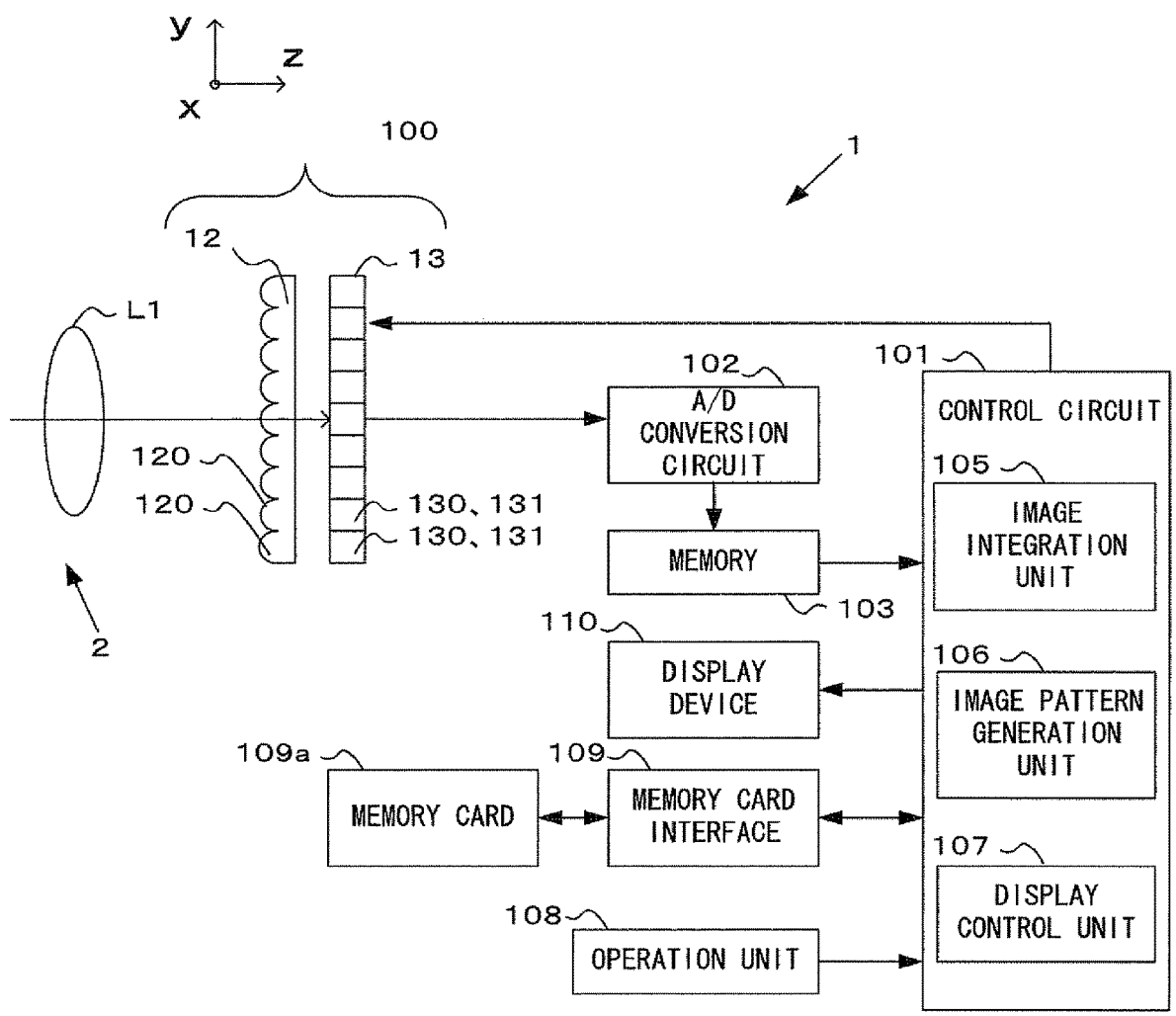
FIG. 1 is a block diagram showing the structure adopted in the digital camera achieved in an embodiment of the present invention.

FIG. 1 shows the structure adopted in the digital camera achieved in the embodiment. The digital camera 1 allows an interchangeable lens 2, which includes a photographic lens L1, to be detachably mounted thereat. The digital camera 1 includes an image capturing unit 100, a control circuit 101, an A/D conversion circuit 102, a memory 103, an operation unit 108, a memory card interface 109 and a display device 110.

The image capturing unit 100, in turn, includes a micro-lens array 12 achieved by disposing numerous micro-lenses 120 in a two-dimensional array and an image sensor 13. It is to be noted that the following description is given by assuming that a z-axis extends parallel to the optical axis of the photographic lens L1 and that an x-axis and a y-axis extend perpendicular to each other within a plane ranging perpendicular to the z-axis.

An image is formed with a light flux traveling from a subject at a position near the focal plane of the photographic lens L1, constituted with a plurality of optical lens groups. It is to be noted that FIG. 1 shows the photographic lens L1 as a single representative lens for purposes of simplification. To the rear of the photographic lens L1, the micro-lens array 12 and the image sensor 13 are disposed in this order in a two-dimensional arrangement within a plane perpendicular to the optical axis of the photographic lens L1. The image sensor 13 is constituted with a CCD image sensor or a CMOS image sensor, equipped with a plurality of photoelectric conversion elements. The image sensor 13 captures a subject image formed on its image capturing plane and outputs photoelectric conversion signals (image signals), which correspond to the subject image, to the A/D conversion circuit 102 under control executed by the control circuit 101. It is to be noted that the image capturing unit 100 will be described in detail later.

The A/D conversion circuit 102 executes analog processing on the image signals output by the image sensor 13 and then converts the analog image signals to digital image signals. The control circuit 101 is constituted with a CPU, a memory and other peripheral circuits. Based upon a control program, the control circuit 101 executes specific arithmetic operations by using signals input thereto from various units constituting the digital camera 1 and then outputs control signals for the individual units in the digital camera 1 so as to control photographing operations. In addition, based upon an operation signal input thereto via the operation unit 108 in response to an operation of an aperture number input button as described later, the control circuit 101 determines a synthetic image aperture number having been selected by the user.

The control circuit 101 has functions fulfilled via an image integration unit 105, an image pattern generation unit 106 and a display control unit 107. The image integration unit 105 generates synthetic image data with image signals by using synthesis pixel affiliation tables corresponding to the synthetic image aperture number determined in response to the operation of the aperture number input button. The image pattern generation unit 106 creates display image data to be used to display at the display device 110, which is to be described in detail later, an image with spatial depth containing three-dimensional information based upon the synthetic image data having been generated by the image integration unit 105 as described later. The display control unit 107, which controls the drive of the display device 110, outputs the display image data having been created by the image pattern generation unit 106 to the display device 110 and enables the display device 110 to display a spatial image containing the corresponding three-dimensional information. It is to be noted that the image integration unit 105 and the image pattern generation unit 106 will be described in detail later.

The memory 103 is a volatile storage medium used to temporarily store the image signals having been digitized via the A/D conversion circuit 102, data currently undergoing image processing, image compression processing or display image data creation processing, and data resulting from the image processing, the image compression processing or the display image data creation processing. At the memory card interface 109, a memory card 109a can be detachably loaded. The memory card interface 109 is an interface circuit that writes image data into the memory card 109a and reads out image data recorded in the memory card 109a as controlled by the control circuit 101. The memory card 109a is a semiconductor memory card such as a compact flash (registered trademark) or an SD card.

Upon sensing a user operation performed thereat, the operation unit 108 outputs a specific operation signal corresponding to the user operation to the control circuit 101. The operation unit 108 includes the aperture number input button, a power button, a shutter release button, buttons related to setting menus, such as a setting menu display changeover button and a setting menu OK button and the like. The user, wishing to enter a specific synthetic image aperture number F, operates the aperture number input button. As the user operates the aperture number input button and a specific aperture number F is thus selected, the operation unit 108 outputs a corresponding operation signal to the control circuit 101.

The display device 110 provides a display of display data created by the control circuit 101 based upon image data recorded in the memory card 109a, in a reproduction mode, in response to an instruction issued by the control circuit 101. In addition, a menu screen, in which various operation settings can be selected for the digital camera 1, is displayed at the display device 110. It is to be noted that the display device 110 will be described in further detail later.

Next, the structure of the image capturing unit 100 is described in detail. As explained earlier, the image capturing unit 100 comprises the micro-lens array 12 and the image sensor 13. The micro-lens array 12 is constituted with a plurality of micro-lenses 120 disposed in a two-dimensional pattern. At the image sensor 13, pixel clusters 130, which receive light having passed through the various micro-lenses 120 mentioned above, are disposed with an array pattern corresponding to the array pattern of the micro-lenses 120. Each pixel cluster 130 is made up with a plurality of photoelectric conversion elements 131 (hereafter referred to as image capturing pixels 131) disposed in a two-dimensional pattern.

Figure 2A:
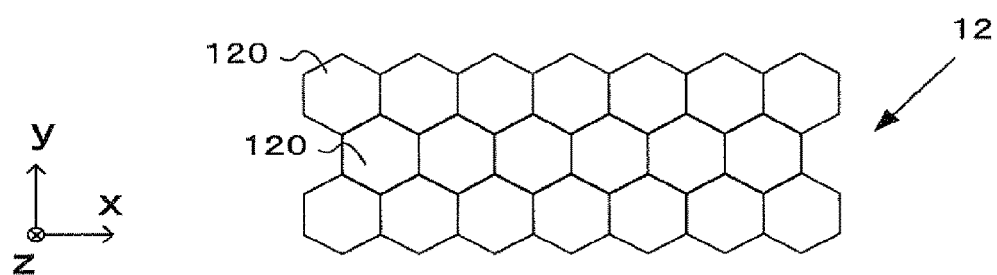
FIGS. 2A and 2B are an example of a positional arrangement that may be assumed for the micro-lenses and the image sensor, with FIG. 2A presenting a plan view taken over the XY plane and FIG. 2B representing the positional relationship along the optical axis (along the z-axis) of the photographic lens.
Figure 2B:
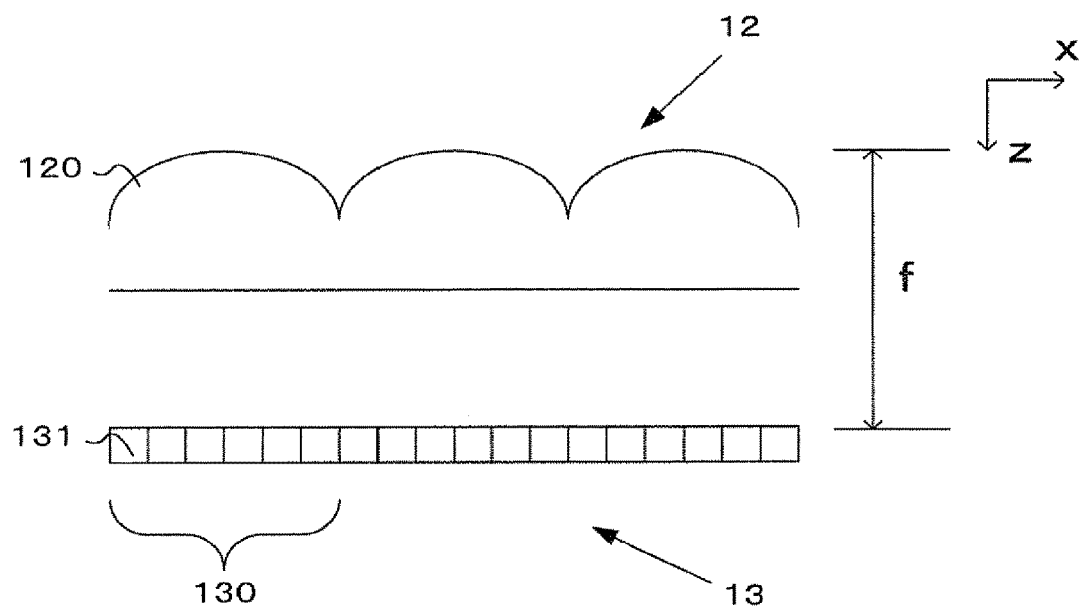

FIG. 2A is a plan view taken over the XY plane, showing the micro-lenses 120 disposed in the micro-lens array 12. As shown in FIG. 2A, a plurality of micro-lenses 120, each assuming a hexagonal shape, are disposed in a honeycomb pattern on the XY plane. It is to be noted that FIG. 2A only shows some of the micro-lenses 120 among the plurality of micro-lenses 120 disposed at the micro-lens array 12. FIG. 2B illustrates the positional relationship between the micro-lens array 12 and the image sensor 13, assumed along the optical axis (along the z-axis) of the photographic lens L1. As shown in FIG. 2B, the image sensor 13 is disposed at a position set apart by a focal length f of the micro-lenses 120. In other words, each pixel cluster 130 made up with a plurality of image capturing pixels 131 assumes a position set apart from the corresponding micro-lens 120 by the focal length f of the micro-lens 120. It is to be noted that FIG. 2B shows only some of the plurality of micro-lenses 120 disposed at the micro-lens array 12 and only some of the plurality of pixel clusters 130 and the plurality of image capturing pixels 131 disposed at the image sensor 13.

The image integration unit 105 creates synthetic image data by using image signals output from the image sensor 13 structured as described above. The image integration unit 105 combines an image signal (hereafter referred to as a cardinal point signal) output from a specific image capturing pixel 131 (hereafter referred to as a cardinal point pixel 132 (see FIG. 3)) among the image capturing pixels 131 making up the pixel cluster 130 disposed in correspondence to a given micro-lens 120, with image signals output from image capturing pixels 131 included in the pixel cluster 130, disposed for the micro-lens 120 corresponding to the cardinal point pixel 132 and pixel clusters 130 corresponding to micro-lenses 120 disposed nearby. The image integration unit 105 generates a synthetic image signal equivalent to a single picture element through this process. The image integration unit 105 executes the processing described above for all the cardinal point pixels corresponding to each micro-lens 120 and generates synthetic image data by adding together the individual synthetic image signals thus generated.

The image integration unit 105, generating the synthetic image signal as described above, references a synthesis pixel affiliation table. The synthesis pixel affiliation table indicates the position at which a given image capturing pixel 131, which outputs an image signal to be combined with the cardinal point signal, is disposed in a pixel cluster 130 corresponding to a specific micro-lens 120. The processing executed by the image integration unit 105 to generate the synthetic image signal by using image signals output from the image capturing pixels 131 is described next.

Figure 3:
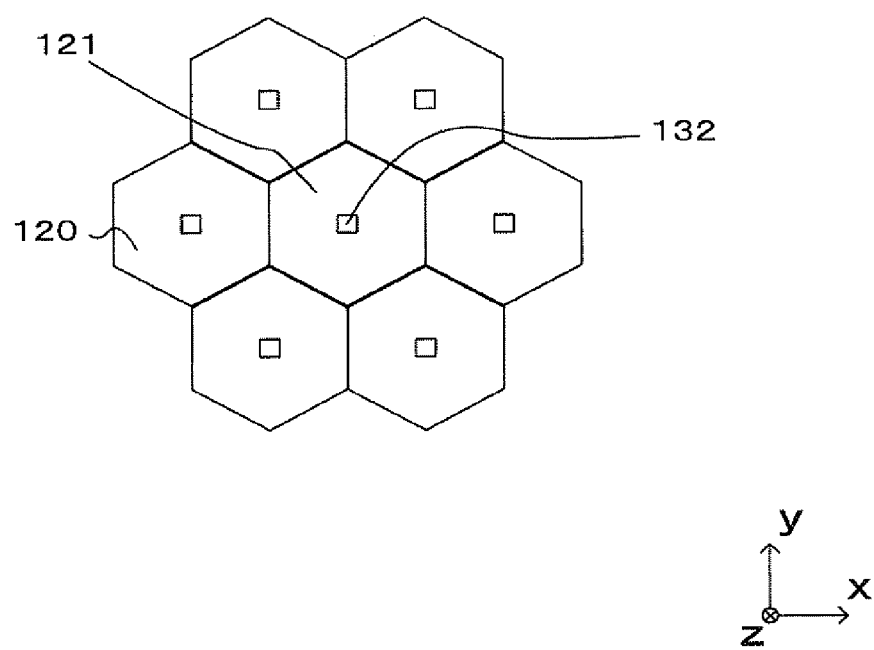
FIG. 3 illustrates the positional relationship between a micro lens and the corresponding cardinal point pixel assumed in the embodiment.

FIG. 3 shows cardinal point pixels 132 disposed in correspondence to the individual micro-lenses 120, i.e., disposed in the individual pixel clusters 130. FIG. 3 shows only some micro-lenses 120 among the plurality of micro-lenses 120 and also shows only the cardinal point pixels 132 among the plurality of image capturing pixels 131. The cardinal point pixels 132 in FIG. 3 are each disposed in correspondence to a pseudo-optical axis of a micro-lens 120. It is to be noted that the embodiment is described by assuming that the term "pseudo-optical axis" refers to the point at which the center of a light flux entering from the pupil of the photographic lens L1 and the principle plane of the micro-lens 120 intersect each other. In the example presented in FIG. 3, the geometrical center of the micro-lens 120 matches the pseudo-optical axis of the micro-lens. In addition, when considering a specific cardinal point pixel 132 the corresponding micro-lens 120 will be referred to as a cardinal point micro-lens 121 in the following description.

—Generation of Synthetic Image Signals—

Figure 4A:
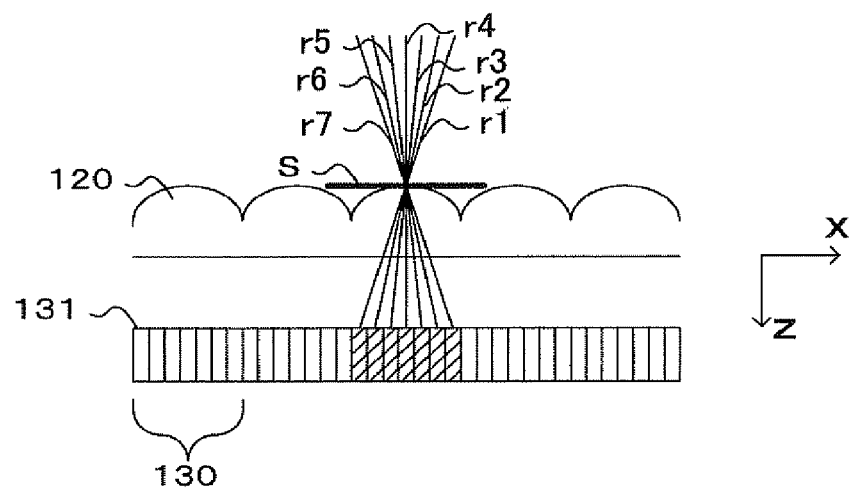
FIGS. 4A and 4B illustrate the principal concept of synthetic image generation, with FIG. 4A illustrating that the focal plane is present at the vertex of the micro-lens and FIG. 4B illustrating that the focal plane is set apart from the vertex of the micro-lens.

First, the synthetic image generation principle applicable to the synthetic image generated when the subject image is formed at the vertex of a micro-lens 120, as shown in FIG. 4A, i.e., when the focal plane S is present at the vertex of the micro-lens 120, is described. In this situation, light fluxes r1 to r7 from the subject enter the image capturing pixels 131 in the pixel cluster 130 disposed in correspondence to the micro-lens 120. The image integration unit 105 generates a synthetic image signal corresponding to one picture element to be part of the synthetic image data by integrating the image signals output from the shaded image capturing pixels 131 among the image capturing pixels 131 in FIG. 4A. The image integration unit 106 generates the synthetic image data by executing this processing for the pixel clusters 130 each corresponding to one of the micro-lenses 120.

Figure 4B:
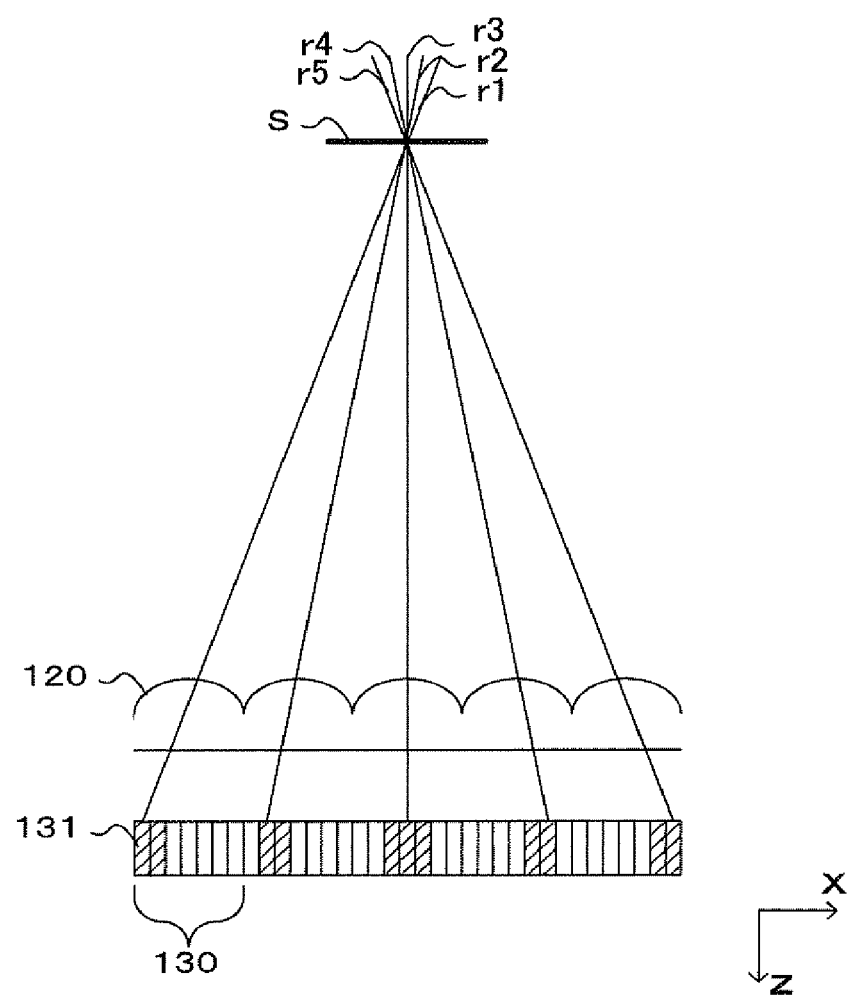

Next, the synthetic image generation principle applicable to a synthetic image signal generated for a subject image formed at a given focal plane (image forming plane) is described. If the focal plane S is set apart from the vertex of the micro-lens 120, light fluxes r1 to r5 from the subject enter a plurality of micro-lenses 120 belonging to different clusters, as shown in FIG. 4B. For this reason, the image integration unit 105 needs to generate a synthetic image signal by using image signals output from image capturing pixels 131 disposed in correspondence to micro-lenses 120 near the cardinal point micro-lens 121, as well. It is to be noted that FIG. 4B simply shows the principle rays to represent the individual light fluxes r1 through r5.

The image integration unit 105 generates synthetic image signal equivalent to one picture element (an image forming area in the synthetic image) to be part of the synthetic image data by integrating all the image signals output from the image capturing pixels 131 contained in an integration area determined in correspondence to the synthetic image aperture number F. It is to be noted that such an integration area is a circular area with a diameter D. The diameter D of the integration area may be expressed as in (1) below, with F representing the aperture number (the synthetic image data aperture number) determined in response to an operation of the aperture number input button 108a and f representing the focal length of the micro-lens 120.

$$D = f/F \tag{1}$$

Figure 5:
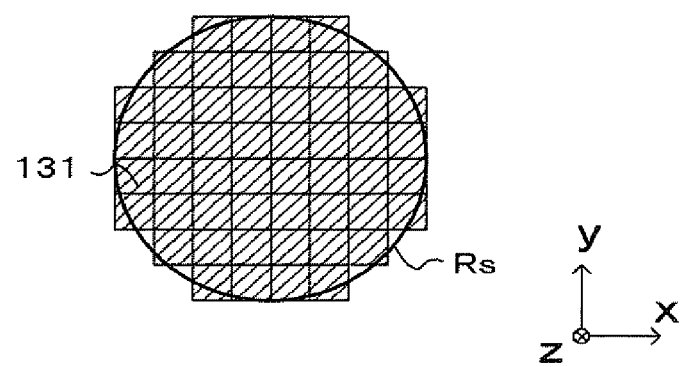
FIG. 5 illustrates the relationship between the integration area over which image signals are integrated for purposes of synthetic image generation and image capturing pixels.

FIG. 5 shows the relationship between the integration area Rs and the image capturing pixels 131. As described above, the image integration unit 106 integrates the image signals output from all the image capturing pixels 131 contained in the circular integration area Rs. In FIG. 5, the image capturing pixels 131 that output image signals to be integrated are shaded. The micro-lens 120 is one of the numerous lenses constituting the micro-lens array 12. This means that the integration area Rs cannot assume a diameter greater than the diameter that individual micro-lenses 120 may assume within the confines of the array pattern of the micro-lenses 120. Accordingly, the largest aperture number F max that can be taken in conjunction with synthetic image data is expressed as in (2) below. It is to be noted that "s" in expression (2) represents the length of a side of an image capturing pixel 131. In addition, the smallest aperture number F min that can be taken in conjunction with synthetic image data matches the F number of the micro-lenses 120.

$$F\max = f/s \tag{2}$$

The synthetic image signal generated by the image integration unit 105 by integrating the image signals output from the pixel cluster 130 that includes the cardinal pixel 132, i.e., the integral value, is expressed as in (3) below. It is to be noted that P in expression (3) represents the output value indicated in the image signal output from an image capturing pixel 131. In addition, "i" in expression (3) indicates an image capturing pixel 131 included in the integration area Rs corresponding to the synthetic image aperture number F and "0" indicates a micro-lens 120 disposed in correspondence to the pixel cluster 130 containing the cardinal point pixel 132, i.e., the cardinal point micro-lens 121.

$$P = \sum_i^F P_{i,0} \tag{3}$$

As described above, the image integration unit 105 executes the integrating operation by using image signals output from image capturing pixels 131 included in pixel clusters 130 corresponding to micro-lenses 120 disposed near the cardinal point micro-lens 121, as well. Namely, the image integration unit 105 integrates the output values indicated in the pixel signals from all the image capturing pixels 131 included in an aggregate F{i} of image capturing pixels 131 contained in the integration area Rs set in correspondence to the synthetic image aperture number F, which includes the image capturing pixels 131 set in correspondence to nearby micro-lenses 120 as well as the image capturing pixels 131 disposed in correspondence to the cardinal point micro-lens 121. The output value P, which is integrated through this process, is expressed as in (4) below. It is to be noted that "t" in expression (4) represents a nearby micro-lens 120, which may be the cardinal point micro-lens 121 itself.

$$P = \sum_i^F P_{i,t} \tag{4}$$

Figure 6A:
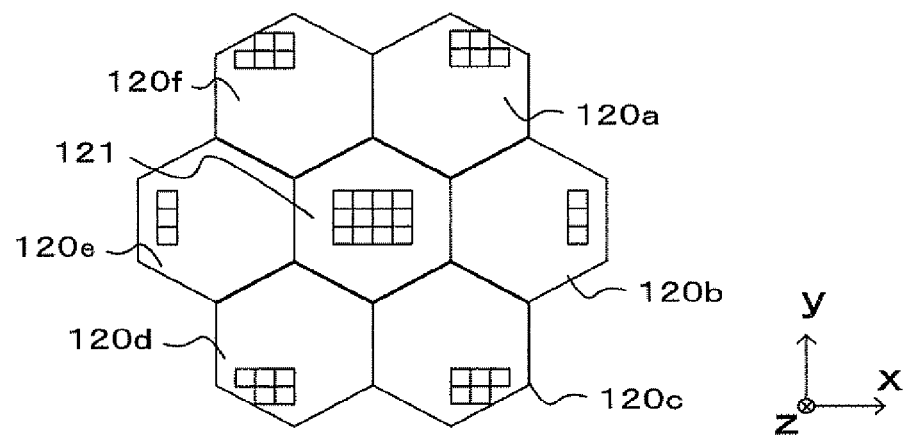
FIGS. 6A and 6B illustrate examples of positional relationships that may be assumed with regard to the positions of the image-capturing pixels that output image signals to be integrated with a cardinal-point signal, with FIG. 6A illustrating the relationship that may be assumed when the focus position of the synthetic image is further toward the subject relative to the micro-lens array and FIG. 6B illustrating the relationship that may be assumed when the focus position of the synthetic image is further toward the image sensor relative to the micro-lens array.
Figure 6B:
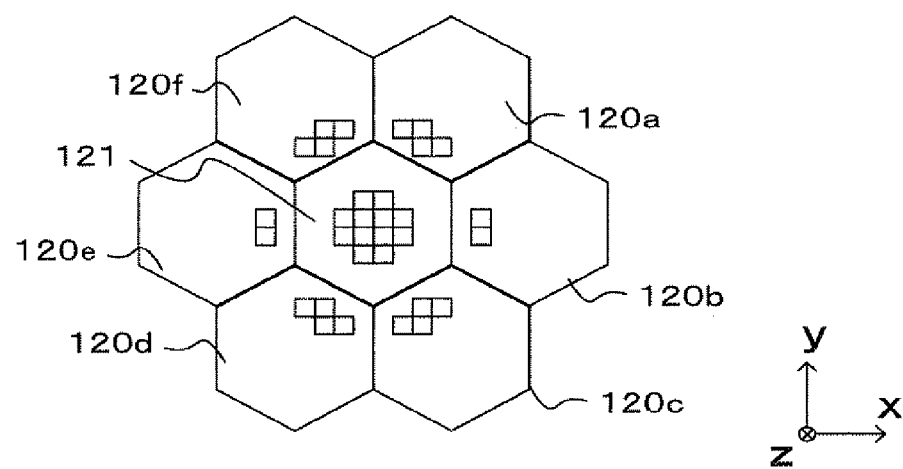

FIGS. 6A and 6B show relationships of the image capturing pixels 131 that output the image signals used by the image integration unit 105 to generate a single synthetic image signal to the cardinal point micro-lens 121 and nearby micro-lenses 120a through 120f adjacent to the cardinal point micro-lens 121. It is to be noted that the FIGS. 6A and 6B do not include an illustration of image capturing pixels 131, the image signals output from which are not used for purposes of synthetic image signal generation. The dispersed image capturing pixels 131, disposed in correspondence to the cardinal point micro-lens 121 and the adjacent micro-lenses 120a through 120f, as shown in FIGS. 6A and 6B, are the plurality of image capturing pixels 131 contained in the integration area Rs defined in correspondence to the synthetic image aperture number F, as shown in FIG. 5, i.e., the plurality of image capturing pixels 131 contained in the integration area Rs.

It is crucial to accurately determine the exact position assumed by each image capturing pixel 131, which outputs an image signal to be integrated with the cardinal point signal, in the pixel cluster 130 corresponding to a specific micro-lens 120, when the image integration unit 105 integrates image signals through the processing described above. Accordingly, a synthesis pixel affiliation table indicating how the individual image capturing pixels 131, each represented by "i" in expressions (3) and (4), are disposed in correspondence to the specific micro-lenses 120a to 120f, i.e., indicating how the individual image capturing pixels 131 are dispersed, is stored in a predetermined storage area. The image integration unit 105 generates the synthetic image signal by referencing the synthesis pixel affiliation table. It is to be noted that such a synthesis pixel affiliation table may be expressed as in (5) below.

$$t = T_d(i) \tag{5}$$

The following is a description of the principal based upon which synthesis pixel affiliation tables are created.

Figure 10:
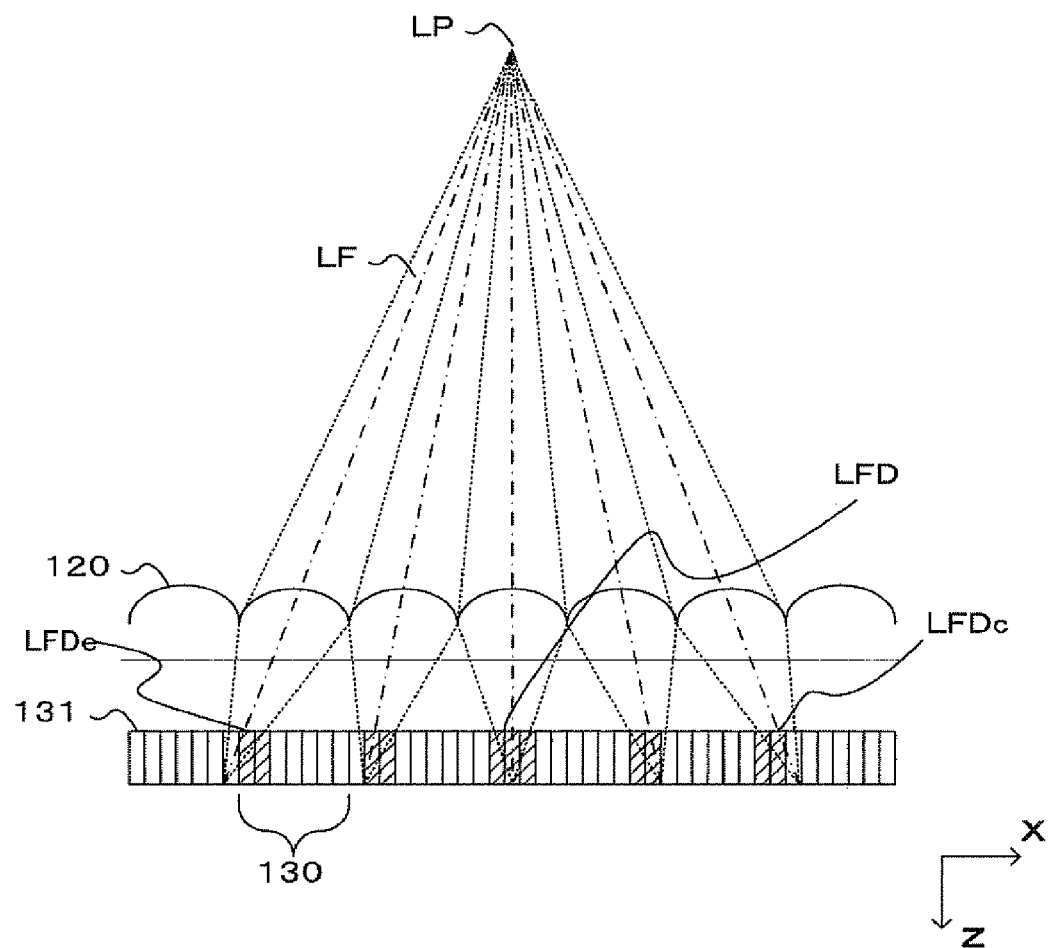
FIG. 10 illustrates light sections of a light flux which, after departing a light point is sliced off at the light-receiving surfaces of image-capturing pixels.

FIG. 10 shows light sections LFD of a light flux that departs a light point LP and travels via the micro-lens array 12 to the light-receiving surfaces of image-capturing pixels 131 where it is sliced off. As shown in FIG. 10, while the light flux LF having departed the light point LP widens, the angle by which it widens is restricted by the image-capturing lens L1 disposed at a preceding stage. For this reason, the light flux LF having entered a given micro-lens 120 is contained within the area covered by the particular micro-lens (although FIG. 10 shows light sections LFDc and LFDe appearing as if they each ranged beyond the area covered by the corresponding micro-lens). This can be substantiated by the fact that the light-receiving surfaces of the image-capturing pixels 131 are set optically conjugate with the pupil of the image-capturing lens L1. When capturing an image via the image-capturing lens L1, a photographic pupil image, i.e., a light boundary, is formed within the area covered by each micro-lens 120 and thus, the light flux LF does not enter the area beyond the area covered by the micro-lens 120.

The following explanation is provided on the premise outlined above. The total quantity of light LF radiated on the micro-lens array 12 shown in FIG. 10, the widening angle of which is restricted by the pupil of the photographic lens L1, in the light flux LF originating from the light point LP, can be calculated by determining the cumulative value of the quantities of light entering image-capturing pixels 131a through 131e corresponding to light sections LFDa to LFDe (generically referred to as an LFD) of the light flux LF. Accordingly, the image integration unit 105 obtaining an image signal through integration, needs to determine through arithmetic operation LFD light sections at the light-receiving surfaces of the image-capturing pixels 131 corresponding to the coordinate value assumed by the light point LP along the z-axis. The "light point LP" viewed from the opposite side can be regarded as a convergence point of a light flux LF emitted from display elements each corresponding to a light section LFD of the light flux LF and advancing as if to retrace the path through which the light flux enters the image-capturing pixels as described above.

As explained earlier, the angle indicating the extent by which the light flux LF departing the light point LP widens is determined by the pupil of the photographic lens L1, i.e., by the F number of the image-capturing lens L1. It is to be noted that in a system without an image-capturing lens L1 such as a display system, the maximum aperture (smallest F number) is defined in correspondence to the F number of the micro-lenses 120. Accordingly, the aperture can be restricted simply by utilizing only a central portion of the area covered by each micro-lens 120.

Figure 11:
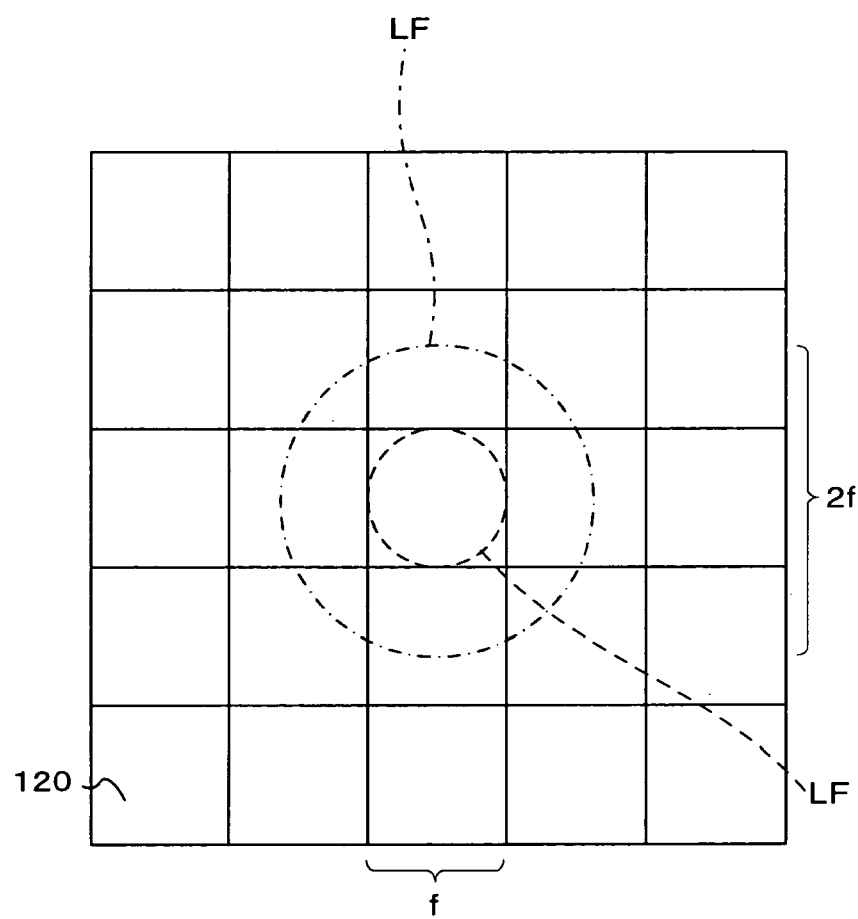
FIG. 11 illustrates relationships between micro-lenses and light sections.

In reference to FIG. 11, showing light fluxes LF originating from light points LP projected onto micro-lenses 120 as widened light fluxes, a specific correspondence between micro-lenses 120 and light sections LFD are described. It is to be noted that FIG. 11 shows micro-lenses 120 disposed in a square grid array so as to facilitate the explanation. In addition, FIG. 11 shows light fluxes LF widening from two different light points LP; a light point LP assuming a position along the z axis that matches the focal length f of the micro-lenses 120 and a light point LP assuming a position along the z-axis matching twice the focal length, i.e., 2f. In FIG. 11, the widened light flux LF departing the light point LP set at the position f is indicated by a dotted line, whereas the widened light flux LF departing the light point LP assuming the position 2f is indicated by a one-point chain line. The extent by which the light flux LF departing the light point LP assuming the position matching the focal length f of a micro-lens 120 widens, is defined by the micro-lens 120 (while the figure shows a circular light section LFD, a light section LFD will take on a square shape if the micro-lens 120 is optically effective through the corners of the square) and thus, the light flux LF enters the single micro-lens 120. The micro-lens 120 corresponding to the particular light point LP is thus determined.

As long as the position of the light point LP matches the focal length f of a micro-lens 120, the light flux LF departing the light point LP widens as a cone of light over the entire area directly under the particular micro-lens 120. Accordingly, the image signals output from all the image-capturing pixels 131 contained in the inscribed circle within the square area should be selected. If the absolute value indicating the position assumed by the light point LP is less than the focal length f, the light flux LF will widen instead of converging within the area directly under the micro-lens 120. However, since the angle by which the incident light flux LF is allowed to widen is restricted, the light section LFD is contained within the area covered by the micro-lens 120.

Figure 12A:
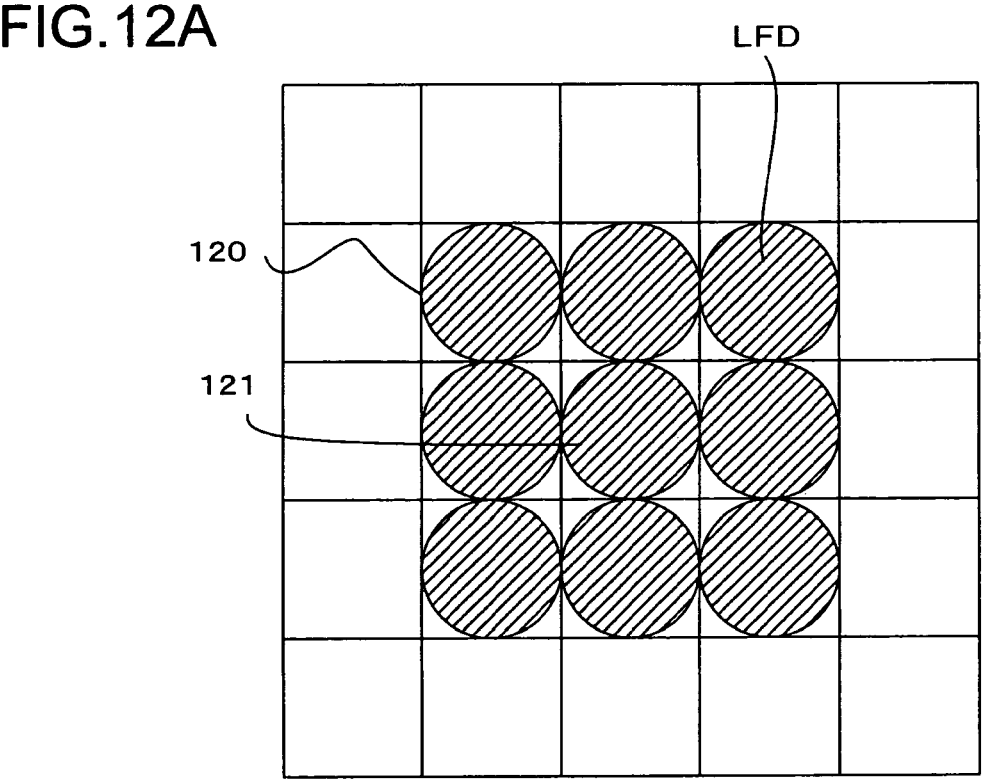
FIGS. 12A and 12B illustrate a relationship between micro-lenses and light sections.
Figure 12B:
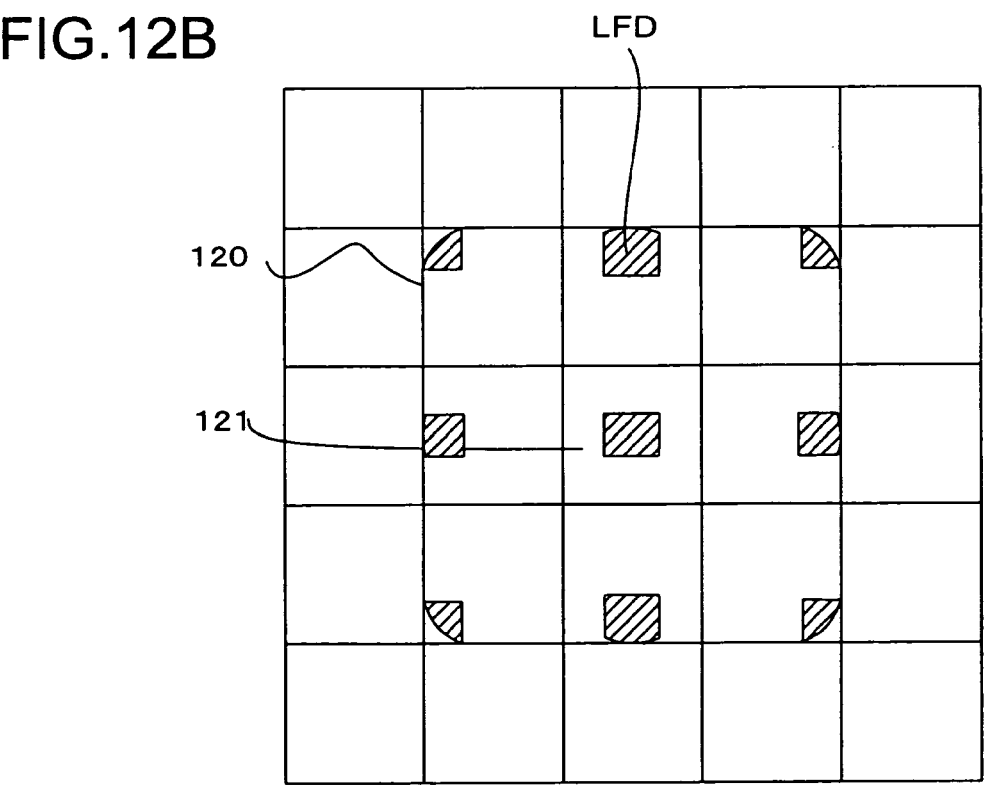

The light flux departing the light point LP assuming the position 2f is described next. FIG. 12 shows the micro-lenses 120 relevant to this light flux. As shown in FIG. 12A, the relevant micro-lenses 120 include the subject micro-lens 120, i.e., the cardinal point micro-lens 121, and the eight micro-lenses 120 surrounding the cardinal point micro-lens 121. Assuming that the opening area is restricted by the individual micro-lenses 120, light sections LFD are bound to be present within the covered areas i.e., the areas covered by the micro-lenses, which are shaded in FIG. 12A. In this situation, the light flux is sliced off over light sections LFD, which are indicated as shaded areas in FIG. 12B at the various micro-lenses 120.

As shown in FIG. 12B, the covered area corresponding to the single cardinal point micro-lens 121 is divided and the divided areas are distributed among the surrounding micro-lenses 120. The whole area achieved by adding up the divided covered areas (partitioned areas) distributed among the neighboring micro-lenses is equivalent to the opening area of a single micro-lens 120. This means that the areal size representing the whole area of the light sections LFD corresponding to a light flux departing a light point LP remains uniform regardless of the position of the light point LP. Accordingly, the total area representing the sum of the partial areas can be calculated by simply determining the specific micro-lens 120 from which the individual partial areas originate.

While FIG. 11 indicates the relationship between the position of the light point LP and the magnification factor, i.e., the quantity of micro-lenses 120 present next to the cardinal point micro-lens 120, this relationship is applicable in a virtual opening area. In the embodiment, the opening area is divided in correspondence to a cluster of micro-lenses 120, reduced based upon the magnification factor, and split pieces of the opening area are set at the corresponding positions within the micro-lenses 120 thus defined. The following description is given on an example in which the square containing opening area is reduced by an extent equivalent to a magnification factor of 2 and the opening area is then divided (area division is applied) in correspondence to the array pattern assumed for the micro-lenses 120.

Figure 13:
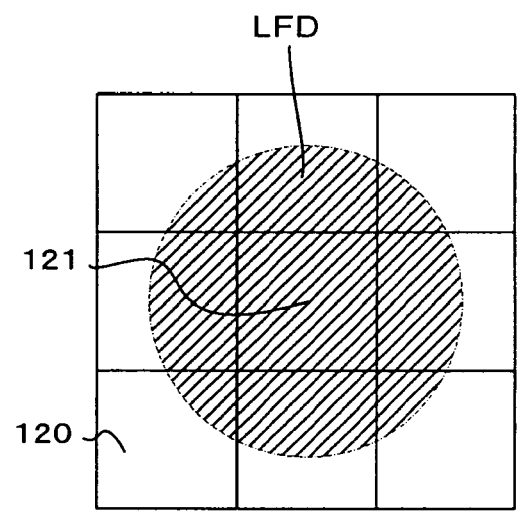
FIG. 13 illustrates light sections resulting from the area division of the area covered by a cardinal point micro-lens.

FIG. 13 shows the light sections LFD resulting from the area division described above are set around the cardinal point micro-lens 121. As the opening area is divided in this manner in correspondence to a specific magnification factor, i.e., a light section LFD pattern corresponding to the specific light point LP, is obtained. In more specific terms, the opening area is divided into a lattice having a width g/m, with "g" representing the diameter of the micro-lenses 120 (the length of each side of a micro-lens). The magnification factor can be expressed as the ratio m=y/f of the height (position) "y" of the light point LP and the focal length f of the micro-lens. The ratio m may take a negative value. When the ratio "m" assumes a negative value, the light point LP may be regarded as being present further toward the image sensor 13 rather than toward the micro-lenses 120.

While it is assumed that the light point LP is present on the pseudo-optical axis along the central axis of a given micro-lens 120 in the description of the example provided above, the calculation described above can be executed without any problem even if the position of the light point LP is offset from the pseudo-optical axis. If the arithmetic operation could not be executed unless the light point LP was set exactly at the center of the lens, the two-dimensional resolution of the synthetic image would be equal to the quantity of the micro-lenses 120, which would prove to be completely inadequate under normal circumstances. For instance, in a configuration in which 100 image-capturing pixels 131 are covered by each micro-lens 120, the resolution of the synthetic image would only be 1/100 of the quantity of the image-capturing pixels. In such a case, 100,000,000 image-capturing pixels 131 would be required in order to generate a synthetic image expressed with 1,000,000 pixels. Accordingly, image synthesis is executed at offset positions as well so as to allow a plurality of light points LP to correspond to a single micro-lens 120.

The product of the area covered by each micro-lens 120 and the quantity of micro-lenses 120 is substantially equal to the total quantity of image-capturing pixels 131 and thus, generating synthetic image data by designating each of a plurality of off-centered points within a given micro-lens 120 as a cardinal point is equivalent to superimposing the image signals from different image-capturing pixels 131. Namely, light fluxes LF having departed the individual off-centered light points LP are superimposed upon one another at each image-capturing pixel 131. However, if the magnification factor is 1, this arithmetic operation will result in simple interpolation, which does not contribute to any improvement in the resolution. This means that when an image is formed near the apex of the micro-lens 120, optical information expressing optical depth will be lost.

Figure 14:
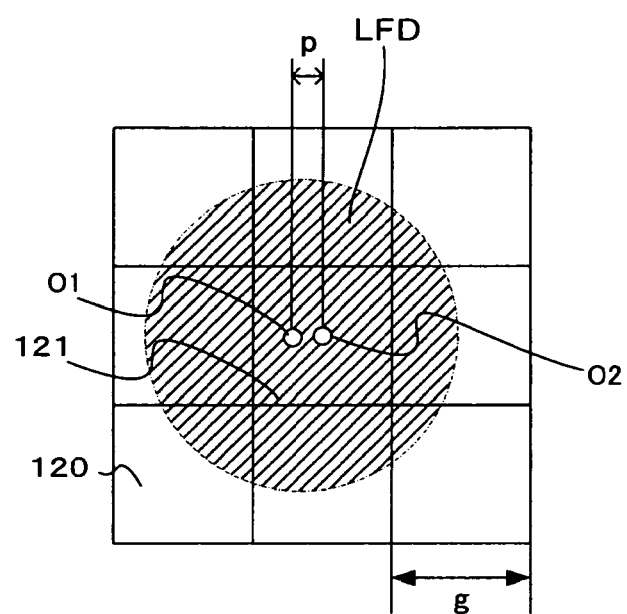
FIG. 14 is an illustration of divided areas formed in correspondence to a light point off-centered relative to the pseudo-optical axis of a cardinal point micro-lens.

FIG. 14 shows divided areas corresponding to a light point LP off-centered to the left relative to the pseudo-optical axis of the cardinal point micro-lens 121. The height (position) of the light point LP, which is offset from the center of the cardinal point micro-lens 121 (with the lens diameter g), i.e., off-centered from the pseudo-optical axis, to the left by an extent p, is 2f. It is to be noted that a point O1 and a point O2 in FIG. 14 respectively indicate the off-centered light point LP and the pseudo-optical axis. In this situation, the divided areas shown in FIG. 14 are defined by shifting the micro-lenses 120 in FIG. 13 to the right by the extent p and then dividing the opening area.

For instance, a micro-lens 120 centered on its pseudo-optical axis set at coordinates (0, 0) may be split into 16 portions with cut-off positions taken at −g/2, −g/4, 0, g/4 and g/2 both along the x-axis and the y-axis. By determining the individual divided areas accordingly and calculating the total of all the divided areas, a group of 16 light points can be obtained in correspondence to the single micro-lens 120.

—Synthesis Pixel Affiliation Table Creation Processing—

The image integration unit 105 references the synthesis pixel affiliation table when it integrates image signals. As described earlier, the synthesis pixel affiliation table makes it possible to ascertain the specific position assumed by each image capturing pixel 131 that outputs an image signal to be combined with the cardinal point signal in a pixel cluster 130 which may correspond to the cardinal point micro-lens 121 or a micro-lens 120 disposed near the cardinal point micro-lens 121.

Once the synthetic image focus position y and the synthetic image aperture number F (field depth) are determined, the image integration unit 105 creates a synthesis pixel affiliation table pertaining to the image capturing pixels 131 that output the image signals to be combined with the cardinal point signal. As explained earlier, specific image capturing pixels 131 corresponding to specific micro-lenses 120, the image signals output from which are to be integrated with the cardinal point signal, are determined in correspondence to the synthetic image focus position.

FIG. 6A shows a relationship that may be assumed when the focus position (focal plane) y of the synthetic image is further toward the subject relative to the micro-lens array 12. FIG. 6B, on the other hand, shows a relationship that may be assumed when the focus position (focal plane) y of the synthetic image is further toward the image sensor 13 relative to the micro-lens array 12. As FIG. 6A and FIG. 6B indicate, among image capturing pixels 131 corresponding to the micro-lens 120a, image capturing pixels 131 taking up different positions are designated as the image signals pixels 131 that output the image signals to be integrated with the cardinal point signals depending upon the position of the focal plane. Likewise, image signals output from the image capturing pixels taking up different positions are used for purposes of integrating operations in correspondence to the other micro-lenses 120b through 120f and the cardinal point micro-lens 121 depending upon the position of the focal plane.

The following is a detailed description of the synthesis pixel affiliation table creation processing executed by the image integration unit 105. The description is given by assuming that the focal plane of the synthetic image assumes a position set apart from the micro-lens array 12 by a distance y, i.e., the focal length is y. In addition, a light flux passing through the pseudo-optical axis of an nth micro-lens 120 taking up the nth position relative to the position of the cardinal point micro-lens 121 enters at a position set apart by a distance x from the pseudo-optical axis of the cardinal point micro-lens 121, as expressed in (6) below. It is to be noted that "d" represents the array pitch with which the individual micro-lenses 120 are disposed.

$$x = fnd/y \quad (6)$$

Considering that the image capturing pixels 131 each receive a light flux with which an image is formed via a corresponding micro-lens 120, the width l of light included in the subject light at the focus position y of the synthetic image, which is radiated via each micro-lens 120 at the image capturing plane of the image sensor 13, can be expressed as in (7) below.

$$l = fd/y \quad (7)$$

This width l of the light represents a ring-shaped area (hereafter referred to as a zone) assuming a width l on the two-dimensional plane of the image sensor 13. This means that a light flux defined in correspondence to the synthetic image aperture number F enters the area defined as the zone l via the micro-lens 120 assuming the nth position counting from the cardinal point micro-lens 121. As expression (7) indicates, the zone l assumes a smaller width as the value representing the synthetic image focus position y increases.

Figure 7:
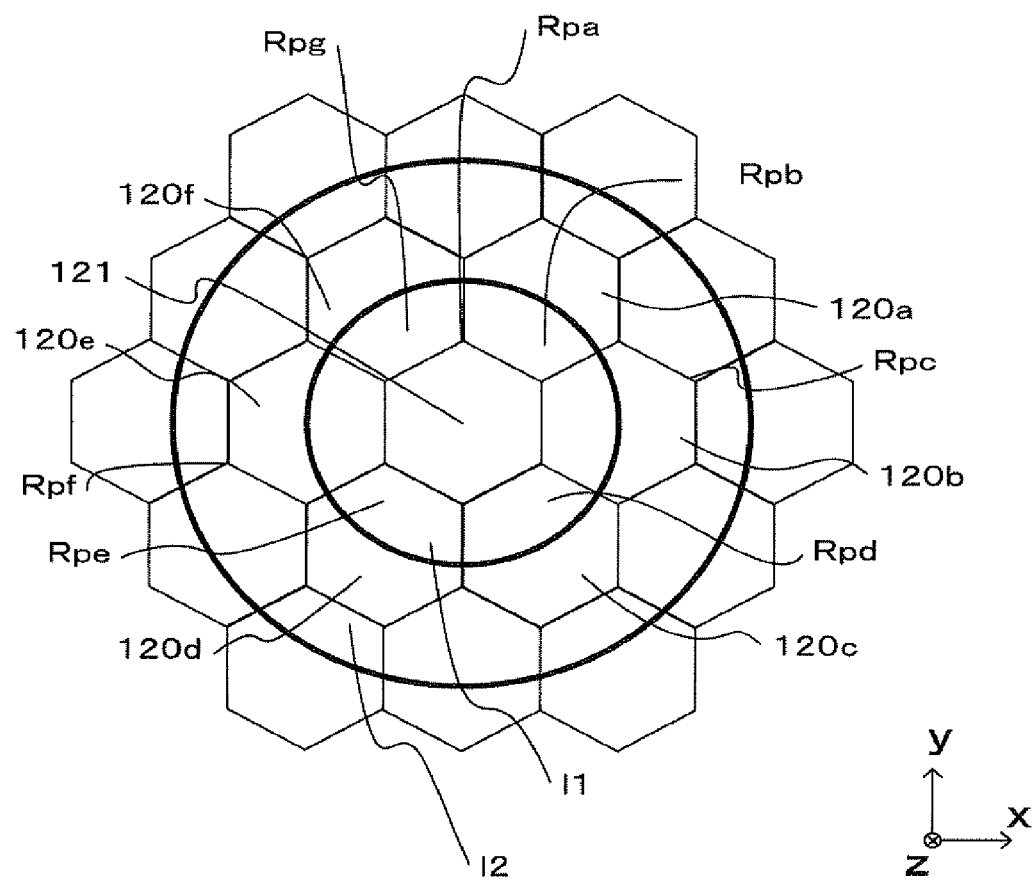
FIG. 7 illustrates an example of a relationship that may be assumed between the zone and the micro-lenses.

As indicated in FIG. 3, the micro-lenses 120 in the embodiment take on a hexagonal shape over the XY plane and the hexagonal micro-lenses are disposed in a honeycomb array in the micro-lens array 12. FIG. 7 shows a zone 11 defined when n=1 and a zone 12 defined when n=2 within the integration area Rs corresponding to a given synthetic image aperture number F. As FIG. 7 indicates, the zone 11 corresponding to n assuming the value of 1 is partitioned by the cardinal point micro-lens 121 and the micro-lenses 120a to 120f and thus partitioned areas Rpa to Rpg are formed. Namely, the individual partitioned areas Rpa to Rpg are covered by different micro-lenses 120. Accordingly, the image integration unit 105 calculates output values Pi, s indicated in the image signals output from the image capturing pixels 131 contained in the various partitioned areas Rpa to Rpg within the zone 11. The image integration unit 105 then simply integrates the output signals in correspondence to the entire integration area Rs, i.e., all the zones 1.

The relationships of micro-lenses 120 that are adjacent to one another among the cardinal point micro-lens 121 and the various micro-lenses 120a to 120f are basically similar. Accordingly, the image integration unit 105 determines the specific partitioned area Rp where a given image capturing pixel 131 among the image capturing pixels 131 contained in the partition areas Rpa to Rpg constituting the zone 11 is present.

The diameter of the integration area Rs containing the image-capturing pixels 131 that output the image signals to be integrated with the image signal output from the cardinal point pixel 132 is expressed as D=f/F. In addition, it is assumed that the array pitch d with which the micro-lenses 120 are disposed along the x-axis (along the horizontal direction), i.e., the diameter of the inscribed circle at each hexagonal micro-lens 120, is equal to the maximum value Dmax that the diameter of the integration area Rs is allowed to take. Furthermore, the focus position (focal length) assumed for the synthetic image is "y" relative to the virtual plane of bend of the micro-lenses 120. In this situation, the areas defined with the projected images formed by projecting the individual micro-lenses 120 at the micro-lens array 12 onto the integration area Rs by magnifying their array pitch "d" by a projection magnification factor of f/y, are each equivalent to one of the partitioned areas Rp, defined in the zone "1", as the individual micro-lenses 120 partition it. Accordingly, the image integration unit 105 creates a synthesis pixel affiliation table represented in the expression (5) for the cardinal point pixel 132, which indicates the correspondence between the position of an image-capturing pixel 131 contained in each partitioned area Rp and the micro-lens 120 that corresponds to the particular partitioned area Rp. It is to be noted that the position of the micro-lens 120 corresponding to a specific partitioned area Rp is determined as a relative position in reference to the position of the cardinal point micro-lens 121.

The synthetic image data generated by referencing synthesis pixel affiliation tables created as described earlier contain stereoscopic information pertaining to a subject with varying focus positions, i.e., assuming a three-dimensional shape. The digital camera 1 achieved in the embodiment generates two-dimensional display image data containing three-dimensional information based upon the synthetic image data that include the stereoscopic information generated as described above and brings up on display an image corresponding to the display image data at the display device 100, which is capable of three-dimensional image display. The user is thus able to observe the three-dimensional display image as an image with spatial depth via the display device 100.

Figure 8A:
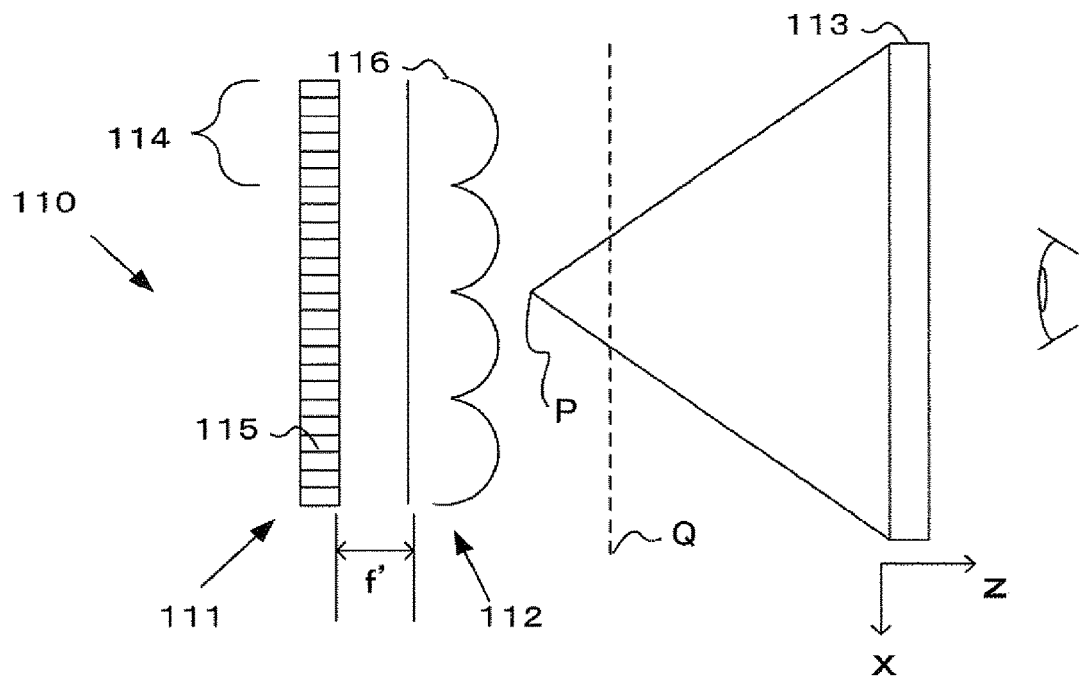
FIGS. 8A and 8B illustrates the structure adopted in the display device in the embodiment, with FIG. 8A schematically illustrating the structure of the display device viewed along the z-axis and FIG. 8B illustrating the positional relationship between the display micro-lens array and the display pixels along the z-axis at the display device.
Figure 8B:
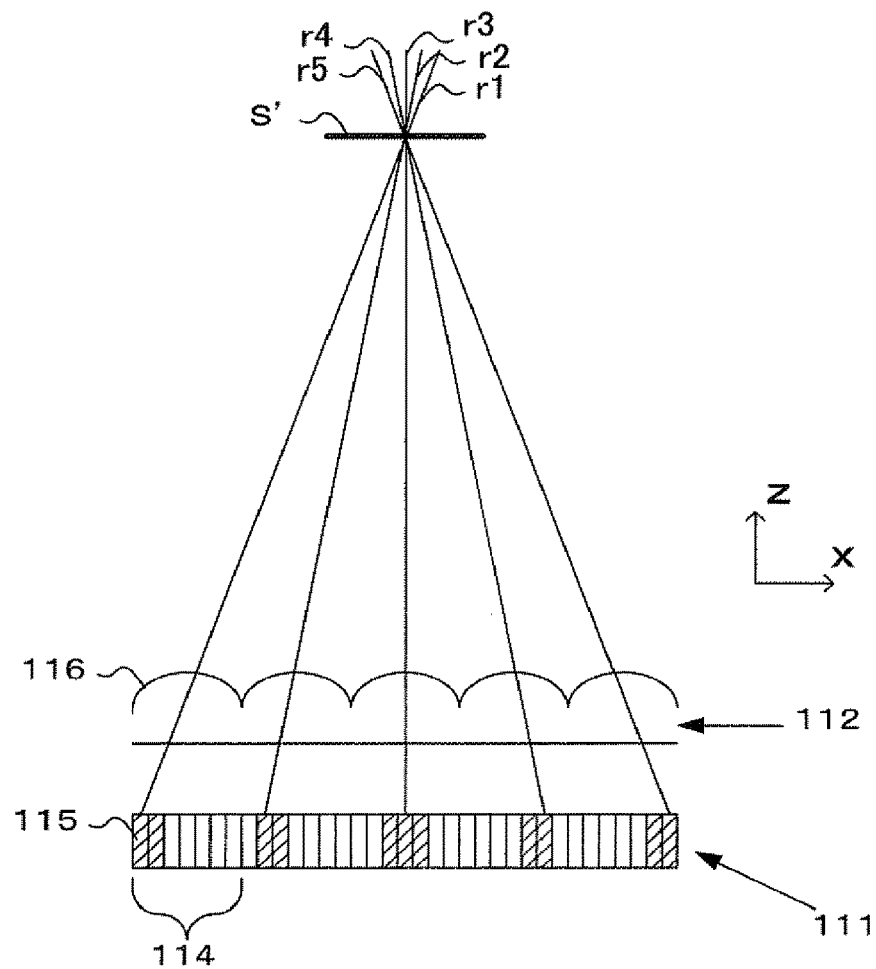

In reference to FIGS. 8A and 8B, the display device 110, at which the display image containing three-dimensional information generated as described above is displayed, is described. FIG. 8A schematically illustrates the structure of the display device 110, viewed along the z-axis. As shown in FIG. 8A, the display device 110 includes a display unit 111, a display micro-lens array 112 and a virtual image lens 113. The display unit 110, which may be a liquid crystal display unit or an organic EL display unit with a backlight, includes a plurality of display pixel clusters 114 disposed in a two-dimensional array. The plurality of display pixel clusters 114 each include a plurality of display pixels 115 disposed in a two-dimensional pattern. The display pixels 115 emit light in correspondence to the display image data, as will be described later, under control executed by the display control unit 107 mentioned earlier.

The display micro-lens array 112 is constituted with a plurality of display micro-lenses 116 disposed in a two-dimensional pattern. The display micro-lens array 112 is disposed at a position set apart from the display pixels 115 by a distance matching the focal length f' of the display micro-lenses 116, further toward the user (viewer) along the z-axis. In addition, the display micro-lenses 116 are disposed by assuming a positional pattern whereby they each correspond to one of the plurality of display pixel clusters 114. An image is formed with the light emitted from the display pixels 115 in correspondence to the image data on a specific image plane located toward the user (viewer) along the z-axis.

The virtual image lens 113, which may be constituted with a Fresnel lens with a large diameter or a diffractive planar lens, assumes a size large enough to cover the entire surface of the display unit 111 over the XY plane. The virtual image lens 113 is disposed at a position at which the user, looking through the virtual lens 113, is able to view the image displayed at the display unit 111 as a virtual image. Namely, the virtual image lens 113 is disposed at a position along the z-axis that sets the image plane Q, at which images are formed via the display micro-lenses 116 as described earlier, further inward relative to the focus position P of the virtual image lens 113. In other words, the virtual lens 113 is disposed at a position that sets the image plane Q between the virtual image lens 113 and the focus position P of the virtual image lens 113.

As indicated in FIG. 8B, the positional relationship between the display micro-lens array 112 and the display pixels 115, assumed along the z-axis at the display device 110, may be considered equivalent to the positional relationship between the micro-lens array 12 and the image capturing pixels 131 assumed along the z-axis at the image capturing unit 100 shown in FIG. 4B. As subject light from a given focus position S enters a plurality of image capturing pixels 131, as shown in FIG. 4B, the image pattern generation unit 106 generates display image data so that display pixels 115 emit light with an arrangement pattern similar to the pattern with which the incident light enters the image capturing pixels 131, as shown in FIG. 6A. In this situation, light fluxes r1 to r5 from the display pixels 115 form an image at the focus position S' via the display micro-lenses 116, as shown in FIG. 8B.

As the correspondence between a given micro-lens 120 and image capturing pixels 131, expressed as in (5) is replicated by a display micro-lens 116 and display pixels 115 for each picture element constituting the synthetic image data, the light emitted from the display unit 111 forms an image at the focus position S' corresponding to the focus position S, which varies from one picture element to another in the synthetic image data. As a result, a display image containing three-dimensional information corresponding to the stereoscopic information in the synthetic image data is formed as a stereoscopic image having spatial depth. The image thus formed gives the effect of the actual depth of the subject in a reduced display image while retaining a stereoscopic sense of presence. Namely, the image is generated by compressing the reciprocal of the distance representing the actual depth of the subject. It is to be noted that FIG. 8B, too, indicates the principal rays of the light fluxes r1 through r5 from display pixels 115.

The image pattern generation unit 106 generates display image data corresponding to the display image described above by using the image signals output from the individual image-capturing pixels 131. At this time, the image pattern generation unit 106 selects a display pixel 115 to emit light with an intensity corresponding to the image signal output from a given image-capturing pixel 131 based upon the synthesis pixel affiliation table. In other words, the image pattern generation unit 105 allocates the image signal output from each image-capturing pixel 131 to the display pixel 115 disposed at the position corresponding to the position of the particular image-capturing pixel 131. However, the light emitted from the display pixels 115 advances along a direction opposite from the direction in which light advances during a photographing operation. This means that if the positional relationship between the micro-lenses 120 and the image-capturing pixels 131 recorded in the synthesis pixel affiliation tables were directly referenced when generating display image data, the perspective of the spatial image viewed by the user would become reversed. Accordingly, the image pattern generation unit 106 assigns an image-capturing pixel 131 recorded in a synthesis pixel affiliation table to a display pixel 115 assuming a position achieving point symmetry around a cardinal point micro-lens 121 to the image-capturing pixel 131. As a result, the image plane of the photographic image can be viewed as an image having spatial depth.

The image pattern generation unit 106 first detects a cardinal point micro-lens 121 in the image capturing unit 100, which corresponds to a given display micro-lens 116 among the plurality of display micro-lenses 116. It is to be noted that data indicating the correspondence between the display micro-lenses 116 and the cardinal point micro-lenses 121 are stored in advance in a predetermined recording area. The image pattern generation unit 106 then detects an image capturing pixel 131 that has output an image signal used to form a synthetic image signal and the position assumed by the particular image capturing pixel 131 on the image sensor 13 by referencing the synthesis pixel affiliation table having been created for the detected cardinal point micro-lens 121.

Figure 9A:
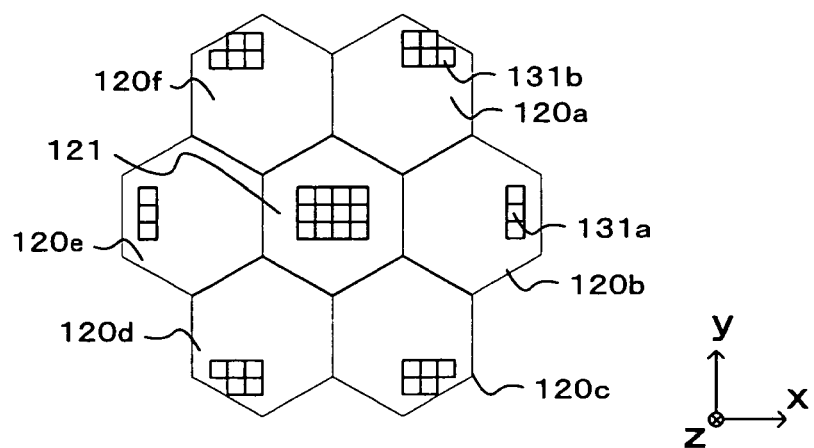
FIGS. 9A and 9B illustrate examples of display pixels to which image signals output from specific image capturing pixels are allocated.

The image pattern generation unit 106 having detected the image capturing pixel 131 and its position then detects, based upon the detected position, the specific position assumed relative to the display micro-lens 116 by the display pixel 115 to be allocated with the image signal from the image capturing pixel 131. The image pattern generation unit 106 then allocates the image signal output from the image capturing pixel 131 to the display pixel 115 thus detected. In other words, the image pattern generation unit 106 designates a display pixel 115a in FIG. 9B as the display pixel 115 to emit light in correspondence to the image signal output from an image capturing pixel 131a in FIG. 9A. If the positional relationship between the micro-lenses 120 and the image capturing pixels 131 and the positional relationship between the display micro-lenses 116 and the display pixels 115 cannot be considered equivalent to each other, the image pattern generation unit 106 allocates the image signal to a display pixel 115 disposed at a position standardized relative to the pseudo-optical axis of the corresponding display micro-lens 116. Consequently, one set of pixel data in the display image data is generated based upon the light fluxes r1 through r5 emitted from the plurality of display pixels 115.

Figure 9B:
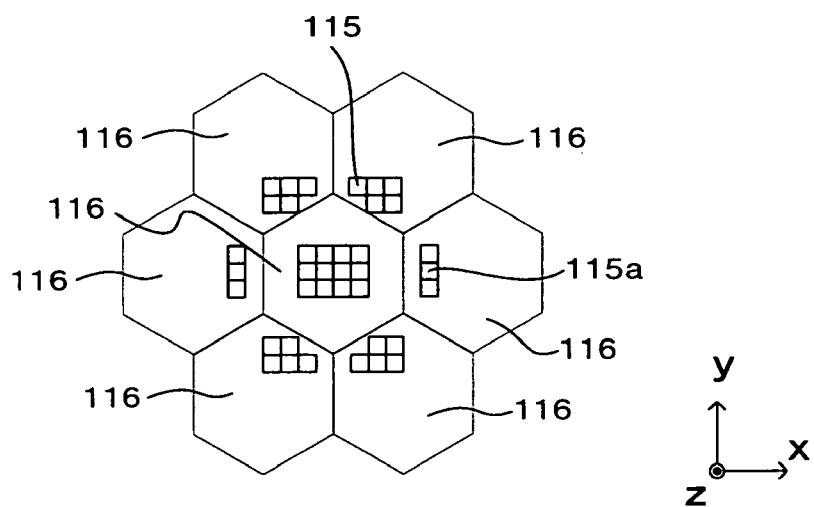

It is to be noted that the display device 110 provides a virtual image display, as described above. Accordingly, the image pattern generation unit 106 must generate the display image data inversed along the top/bottom direction (along the y-axis) relative to the synthetic image data. Namely, the image pattern generation unit 106 allocates the image signal output from a given image capturing pixel 131 to a display pixel 115 disposed at a position achieving symmetry along the top/bottom direction (along the y-axis), in reference to the pseudo-optical axis of the display micro-lens 116. For instance, the image pattern generation unit 106 will allocate the image signal output from an image capturing pixel 131b in FIG. 9A to a display pixel 115, as shown in FIG. 9B.

The image pattern generation unit 106 executes the processing described above in correspondence to all the display micro-lenses 116. The image pattern generation unit 106 may calculate the sum of image signals output from a plurality of image capturing pixels 131 through weighted addition and allocate the weighted sum of the image signals to a single display pixel 115. Through the process described above, display image data are generated by the image pattern generation unit 106. The image pattern generation unit 106 then outputs the display image data to the display device 110 via the display control unit 107.

As the individual display pixels 115 emit light based upon the display image data generated as described above, a three-dimensional image plane achieving a relief effect based upon the three-dimensional information is formed via the display micro-lenses 116. The three-dimensional image plane, projected via the virtual image lens 113 in a predetermined size, is then viewed by the user as a three-dimensional image having spatial depth. In other words, the three-dimensional image plane formed by the display unit 111 and the display micro-lenses 116 is optically equivalent to the image forming plane that manifests when a three-dimensional subject is photographed by using the photographic lens L1. Thus, an image of the three-dimensional subject formed near the estimated image plane can be reproduced via the virtual image lens 113 as a three-dimensional image having spatial depth. Consequently, the user is able to view a stereoscopic image at the display device 110 as a three-dimensional image having spatial depth.

The following advantages are achieved with the digital camera 1 in the embodiment described above.

(1) The image integration unit 105 generates synthetic image data containing information pertaining to a plurality of focus positions by using image signals output from the image sensor 13 and the image pattern generation unit 106 generates display image data containing three-dimensional information based upon the synthetic image data. The plurality of display pixels 115 disposed in a two-dimensional pattern at the display unit 111 emit light fluxes in correspondence to the display image data. The display micro-lens array 112 includes a plurality of display micro-lenses 116, via which a three-dimensional image is formed by combining light fluxes emitted from the plurality of display pixels 115, disposed in a two-dimensional pattern, and the virtual image lens 113 assumes a structure that allows the user to view the three-dimensional image formed via the display micro-lenses 116. As a result, the user is able to view an image of a subject assuming a three-dimensional shape as a three-dimensional image having spatial depth on a screen instead of in a stereoscopic display provided by taking advantage of the parallax effect manifested by the right eye and the left eye of the user through stereoscopic technologies or lenticular technologies. Since the user is able to view an image that is reproduced as an actual three-dimensional image instead of an image perceived as a three-dimensional image through a stereoscopic optical illusion, issues of the stereoscopic image display in the related art, to which such undesirable physiological reactions as optically induced nausea and inhibition of the visualization function in young children have been attributed, can be effectively prevented. Furthermore, since no special three-dimensional glasses or the like are required, the user is able to view images over an extended period of time.

In addition, in order to reproduce a stereoscopic image achieving, for instance, a 100,000 pixel resolution through the hologram method with a display redundancy factor of 1000:1 or more, the display unit will need to be equipped with at least 1,000,000,000 pixels. In contrast, a three-dimensional image with spatial depth can be displayed at the display device 110 in the embodiment, as long as it is equipped with pixels, the quantity of which is equivalent to a redundancy factor of 100 to 1000 times the image resolution. Moreover, a three-dimensional image with spatial depth can be reproduced by projecting an image photographed as a three-dimensional image through a simple structure without requiring a structural element such as a gradient index lens or the like, which would otherwise be needed for displaying the image as an upright image.

(2) The plurality of display micro-lenses 116 are each disposed in correspondence to a plurality of display pixels 115 and the image pattern generation unit 106 generates display image data so that each picture element in the three-dimensional image is formed with light fluxes emitted from the plurality of display pixels 115 disposed in correspondence to a plurality of display micro-lenses 116. In other words, the image pattern generation unit 106 generates display image data so that a positional relationship, equivalent to the positional relationship among the plurality of image capturing pixels corresponding to one set of pixel data in the synthetic image data, is achieved among the plurality of display pixels 115 via which the light fluxes are emitted. Consequently, display image data containing three-dimensional information can be generated with ease by allocating the image signals output from specific image capturing pixels 131 to the corresponding display pixel 115.

(3) The virtual image lens 113 is disposed so that a three-dimensional image plane is formed via the display micro-lenses 116 between the virtual image lens 113 and its focal length. Consequently, the two-dimensional display image data generated by the image pattern generation unit 106 can be viewed as a three-dimensional image with spatial depth through a simple structure.

The digital camera 1 achieved in the embodiment as described above allows for the following variations.

(1) While the display image data generated by the image pattern generation unit 106 based upon the synthetic image data generated by the image integration unit 105 are displayed at the display device 110 in the embodiment described above, display image data may instead be brought up on display at a monitor of an external display device (e.g., a personal computer, a television set or the like) other than the digital camera 1. In such a case, the external display device will read synthetic image data having been generated in the digital camera 1 and recorded in the memory card 109a. The display device will then generate display image data through processing similar to that executed by the image pattern generation unit 105 by using the synthetic image data having been read and output the display image data to the monitor.

In this application, the monitor of the display device will need to be configured so as to enable viewing of three-dimensional images with spatial depth, as does the display device 110 achieved in the embodiment. Namely, it will need to be configured as shown in FIG. 8 to include a display unit with a plurality of display pixels disposed in a two-dimensional pattern, a micro-lens array with a plurality of micro-lenses, via which an image is to be formed with light fluxes from the display pixels, disposed in a two-dimensional pattern and a virtual image lens through which the user is able to view a three-dimensional image formed via the micro-lenses as a virtual image. In addition, the display device may read a multiple-viewpoint image file from the digital camera 1 through an interface such as a LAN cable or a wireless communication interface.

Figure 15:
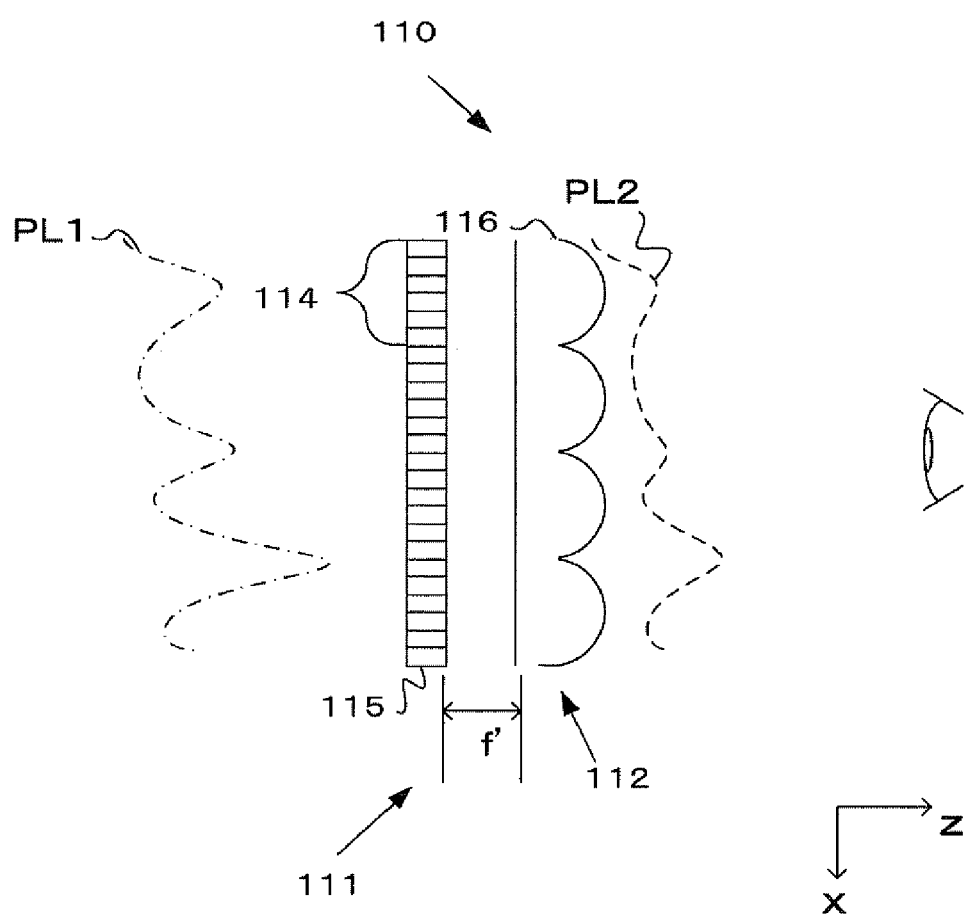
FIG. 15 is an illustration of the spatial depth of a stereoscopic image brought up on display.

(2) The display unit included in the digital camera 1 or an external display device does not need to be equipped with a virtual image lens 113. Even when the display unit does not include a virtual image lens 113, display image data can be generated as has been explained in reference to the embodiment. However, the image pattern generation unit 106 does not execute processing for generating display image data so as to reverse the display image data along the top/bottom direction (along the y-axis) relative to the synthetic image data. The plane of the image brought up on display in this situation is not a replication of a three-dimensional image in the strict sense. Rather, it is a replication of the image plane compressed via the photographic lens 1 at a point near the focus point, as is the image captured through a photographing operation. Since there is a linear relation with regard to the distance and the reciprocal of the focal length, hardly any stereoscopic detail will be reproduced when the distance becomes significant. In contrast, expression of a given depth will be enhanced at a closer distance. As an eye can be regarded as an optical device operating at a given image plane, an object expressed as a stereoscopic image at a position closer than the actual position of the subject, is bound to be rendered with its depth more compressed than it actually is. Accordingly, based upon this concept, an image plane PL1 indicated by the one-point chain line in FIG. 15 is expressed at the display device 110 as an image plane PL2, achieved by compressing the image plane PL1 as indicated by the dotted line, near the lens array. The depth of the image plane PL1, appearing at a position different from its actual position, may be adjusted in correspondence.

The display screen normally has a greater area than the image-capturing area of the image sensor 131 in the digital camera 1 used to take the picture. For instance, the dimensions of even the "full size" image sensor typically installed in the digital camera 1 will be 35×24 (mm), which are less than ⅒ the size of a regular 20 inch (40.6×30.5) television monitor. Assuming, for the sake of simplification, that the display screen is 10 times larger than the image-capturing area, an image of a subject captured with a photographic magnification factor of 1/20 (equivalent to a 50 mm lens/1 m position) will be displayed with a magnification factor of ½. Unlike in two-dimensional display, the display contents of a three-dimensional image of a subject magnified by a factor of 10 for display over a distance 10 times longer, the display contents of a three-dimensional image of the subject magnified by a factor of 1 and displayed over a range matching the actual distance, and the display contents of a three-dimensional image magnified by a factor of ⅒ and displayed over ⅒ the actual distance greatly differ from one another. While the second three-dimensional image will have greater depth and a better stereoscopic effect relative to the first three-dimensional image, the third three-dimensional image will achieve the greatest depth and the best stereoscopic effect among the three images.

Next, the display depth is explained. The height assumed along the depthwise direction is compressed via the display micro-lens array 112 mounted at the display device 110. "k" represents the ratio of the size of the image sensor 13 at the digital camera 1 used as an input member and the size of the display unit 111. Two different scenarios, i.e., the photographic magnification factor (the ratio of the size of the subject and the size of the subject image) exceeding k and the photographic magnification factor equal to or less than k, are individually described below.

"n" represents the photographic magnification factor. If the photographic magnification factor exceeds "k", i.e., if the subject is present at a position set apart from the digital camera 1 by a distance equal to or greater than a specific value, a two-dimensional image of the subject, the size of which is reduced by a factor of 1/n, is captured at the image sensor 13 and the subject image is then displayed at the display unit 111 with the size thereof adjusted to the factor of k/n. Since n>k, the subject on display will assume a size smaller than its actual size, so as to appear as if the subject is present further away from the viewer, beyond the display surface of the display unit 111. At the display device 110 according to the present invention, the stereoscopic image is displayed near the display micro-lens array 112. The magnification factor to be assumed along the depthwise direction can be expressed as in (8) below with "d" representing the distance to the display surface and "y" representing the distance to the subject being photographed.

$$M=(y/d)^2 \quad (8)$$

Since the image is displayed with the display magnification factor of k/n, the depthwise magnification factor may also be considered to be $(n/k)^2$. Assuming that the photographic magnification factor is 50 and that the display screen at the display unit 111 is 10 times larger than the image sensor 13, the depthwise magnification factor will be 25. In this situation, an object with a depthwise dimension of 20 cm will assume an image plane height of 80 μm in the digital camera 1 and an image plane height of 8 mm on the display unit 111. If the F number at the display micro-lens array 112 and the F number at the micro-lens array 12 of the digital camera 1 engaged in the photographing operation are equal to each other, the size of the display unit 111 is 10 times larger. Thus, an image height of only approximately 800 μm will be achieved at the display unit 111.

Accordingly, better image size coordination is achieved by raising the F number of the display micro-lenses 116. However, it is not feasible to set the F number of the display micro-lenses 116 to 40 in conjunction with the micro-lenses 120 in the digital camera 1 assuming an F number of 4. Rather, it is more reasonable to set the F number of the display micro-lenses 116 to, for instance, 8 or 16. At such as setting, the spatial image can be provided without compromising the stereoscopic effect even though the appearance of depth in the spatial image is somewhat reduced, since stereoscopic perception in humans is a relative and qualitative cognitive phenomenon.

Figure 16:
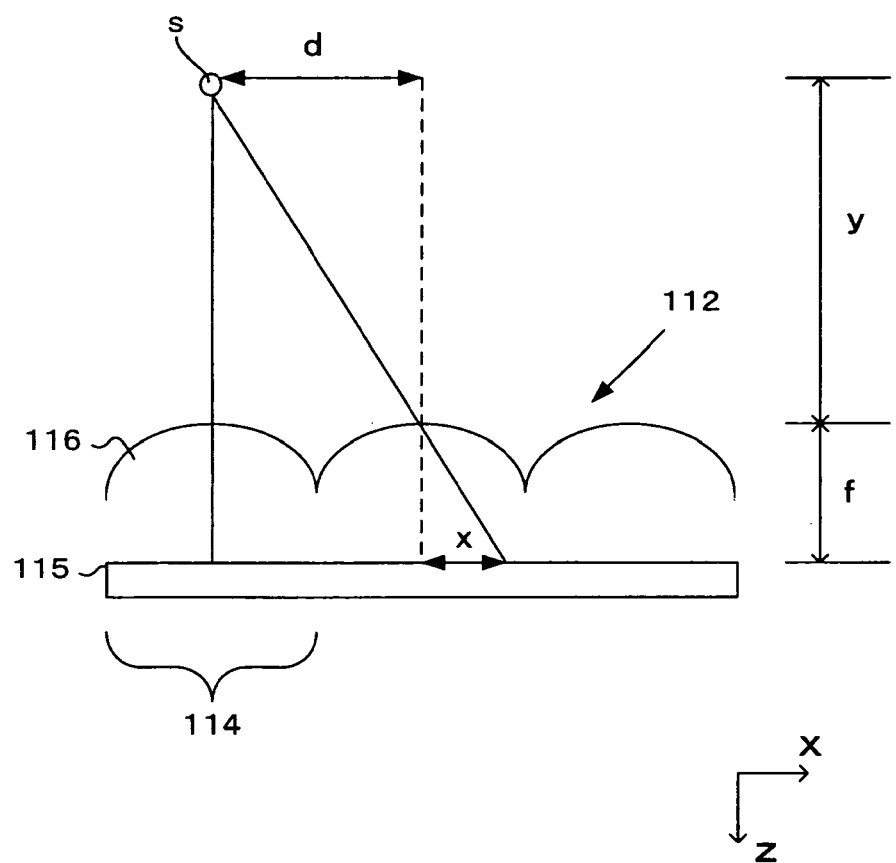
FIG. 16 illustrates the relationship between the focus position and the plane at which display pixels are arrayed.

The following is a description of how the depth of an image having spatial depth can be increased by raising the F number of the display micro-lenses 116. As the relationship between the focus position and the plane at which a display pixel 115 is present in FIG. 16 indicates, the relationship expressed as in (9) below exists with "y" representing the height of the optical image, "x" representing the coordinate point indicating the distance from the center (pseudo optical axis) of a display micro-lens 116, "d" representing the distance between display micro-lens 116 centers and f representing the focal length of the display micro-lenses.

$$y/nd=f/x \quad (9)$$

It is to be noted that "n" is an integer used to indicate a relationship to a given micro-lens, with n=1 indicating a first display micro-lens 116 disposed immediately next to the given micro-lens and n=2 indicating the display micro-lens 116 disposed next to the first display micro-lens 116.

The relationship expressed in (9) above is equally applicable to the digital camera 1 and the display device 110. The relationship expressed in (9) indicates that the height "y" of the optical image of the spatial image replicated at the display unit 111 is in proportion to the focal length "f" of the display micro-lenses 116. If the size of the display unit 111 is 10 times the size of the image sensor 13, the focal length "f" will also be 10 times larger. This means that if the display micro-lens array 112 and the micro-lens array 12 assume F numbers equal to each other, an image having spatial depth enlarged by a factor of 10 will therefore be displayed at a height 10 times larger. Thus, the height "y" can be further enhanced by setting the focal length of the display micro-lenses 116 to a value 20 or 30 times as large, i.e., by doubling or tripling the F number of the display micro-lenses 116.

Next, an image displayed with a magnification factor n/k<1 is explained. The three-dimensional depth of an image of a subject present at close range is somewhat different from that of an image of the subject at a significant distance. In close-up photographing, i.e., when capturing an image of a subject at close range at a low magnification factor, the viewer does not wish to view a life-size image. For instance, the viewer of a close-up photographic image of a honeybee will not expect the image to be displayed as a stereoscopic life-size image at the display unit 111 or as an image having spatial depth. Rather, a stereoscopic image showing a pigeon-sized honeybee displayed over some distance will be perceived as a natural image, since the viewer would not be able to tell whether the life size (small) insect on display were a wasp or a bee. There is another point to bear in mind, that we have been conditioned to looking at small subjects such as insects in enlarged display.

Assuming that a life-size image of a subject is captured via a 50 mm photographic lens L1 at the digital camera 1, the depth at the image plane of the life-size image will be retained intact. If the subject image saved as the life-size image is output to the display unit 111 for display enlarged 10 times, as described earlier, a 20 cm bee will be displayed at a 500 mm position. As the viewer looks at the display unit 111 from a distance of 1 m, the depth perceived by the viewer will be multiplied by a factor of 4, i.e., the stereoscopic effect will be enhanced.

As described above, the magnification factor of the photographic image or the display image affects the stereoscopic effect to a considerable extent. However, the human perception of depth is not absolute and the stereoscopic cognizance by human is determined by the depth of the subject relative to the depth of something else, instead of by any absolute value. According to the present invention, while the absolute value representing the extent of depth is altered in correspondence to the photographic magnification factor, the relationship between the extent of depth and the photographic magnification factor relative to each other is sustained intact, which makes it possible to provide a distinct stereoscopic effect for the viewer. In addition, the present invention, which provides fully stereoscopic image, is fundamentally different from the stereoscopic technology of the known art that achieves a stereoscopic effect through parallax and places a lesser load on human visual perception without inducing any undesirable phenomena such as stereoscopic nausea.

Furthermore, as long as the features characterizing the present invention are not compromised, the present invention is not limited to the particulars of the embodiment described above and other modes that are conceivable within the technical scope of the present invention are also within the scope of invention.

What is claimed is:

1. An image display device, comprising:
    an input unit into which a plurality of image signals are inputted, the image signals being outputted from a plurality of image capturing pixels that are disposed in correspondence to a plurality of image capturing micro-lenses, each of the image capturing pixels receiving light passed through a corresponding one of the image capturing micro-lenses;
    a plurality of display micro-lenses;
    a plurality of display pixels that emit light for forming a three-dimensional image to the display micro-lenses, the plurality of display pixels being disposed in correspondence to the plurality of display micro-lenses;
    a generator that generates display image data that includes three-dimensional information, based upon the plurality of image signals inputted into the input unit; and
    a controller that causes the display pixels to emit light based upon the display image data to form the three-dimensional image, wherein
    in a case that a number of the image capturing pixels disposed in correspondence to the image capturing micro-lenses is different from a number of the display pixels disposed in correspondence to the display micro-lenses, the generator generates the display image data so that a number of the image signals matches the number of the display pixels,
    the three-dimensional image includes a first position at which light from a first display pixel disposed corresponding to a first display micro-lens among the plurality of display micro-lenses and light from a second display pixel disposed corresponding to a second display micro-lens among the plurality of display micro-lenses intersect and a second position at which light from a third display pixel disposed corresponding to the first micro-lens and light from a fourth display pixel disposed corresponding to the second display micro-lens intersect, and
    a first distance between the first position and the display micro-lenses is different from a second distance between the second position and the display micro-lenses.

2. The image display device according to claim 1, wherein
    the generator generates the display image data by adding the plurality of image signals, in a case that the number of the image signals inputted into the input unit is larger than the number of the display pixels.

3. The image display device according to claim 1, wherein
    in a case that an allocation of the image capturing pixels corresponding to the image capturing micro-lenses is different from an allocation of the display pixels corresponding to the display micro-lenses, the generator generates the image data so that a predetermined display pixel, of the plurality of display pixels, emits light based upon a first image signal, the predetermined display pixel being disposed at a same position relative to a central position of the display micro-lenses as a position of a predetermined image capturing pixel, of the plurality of image capturing pixels, relative to a central position of the image capturing micro-lenses, the predetermined image capturing pixel outputting the first image signal.

* * * * *